(12) United States Patent
Goodchild

(10) Patent No.: US 11,605,987 B2
(45) Date of Patent: Mar. 14, 2023

(54) DIGITAL PING LOCKOUT IN A MULTI-COIL WIRELESS CHARGING DEVICE

(71) Applicant: AIRA, Inc., Chandler, AZ (US)

(72) Inventor: Eric Heindel Goodchild, Phoenix, AZ (US)

(73) Assignee: AIRA, INC., Chander, AZ (US)

( * ) Notice: Subject to any disclaimer, the term of this patent is extended or adjusted under 35 U.S.C. 154(b) by 202 days.

(21) Appl. No.: 16/952,065

(22) Filed: Nov. 18, 2020

(65) Prior Publication Data
US 2021/0152037 A1 May 20, 2021

Related U.S. Application Data

(60) Provisional application No. 63/066,315, filed on Aug. 16, 2020, provisional application No. 62/938,308, filed on Nov. 20, 2019.

(51) Int. Cl.
| | |
|---|---|
| *H02J 50/40* | (2016.01) |
| *H02J 50/90* | (2016.01) |
| *H02J 50/80* | (2016.01) |
| *H02J 50/10* | (2016.01) |
| *H02J 50/12* | (2016.01) |

(52) U.S. Cl.
CPC .............. *H02J 50/80* (2016.02); *H02J 50/10* (2016.02); *H02J 50/12* (2016.02); *H02J 50/402* (2020.01); *H02J 50/90* (2016.02)

(58) Field of Classification Search
CPC .. H02J 50/80; H02J 50/10; H02J 50/12; H02J 50/402; H02J 50/90
See application file for complete search history.

(56) References Cited

U.S. PATENT DOCUMENTS

| | | | |
|---|---|---|---|
| 2014/0239732 A1 | 8/2014 | Mach et al. | |
| 2016/0056664 A1* | 2/2016 | Partovi | H01F 38/14 |
| | | | 307/104 |
| 2019/0097448 A1* | 3/2019 | Partovi | H01F 38/14 |
| 2019/0173309 A1 | 6/2019 | Jung | |
| 2019/0267828 A1* | 8/2019 | Goodchild | H02J 7/0045 |

(Continued)

OTHER PUBLICATIONS

International Search Report and Written Opinion, PCT/US2020/061364, dated Feb. 9, 2021, 7 pgs.

*Primary Examiner* — Stacy Whitmore
(74) *Attorney, Agent, or Firm* — Loza & Loza, LLP; Anthony Smyth

(57) ABSTRACT

Systems, methods and apparatus for wireless charging are disclosed. A charging device has a plurality of charging cells provided on a charging surface, a charging circuit and a controller. The controller may be configured to detect an object in proximity to a surface of the charging device through a passive ping. The controller is also configured to ping the detected object with an active ping, and determine whether a ping response is received from the object in response to the one or more active pings from the charging device. Additionally, the controller is configured to stop the active pinging of the detected object when no ping response is received in the charging device after a count of successively issued active pings from the at least one coil exceeds a predetermined number. The result is lockout of digital pinging when passive pinging detects an object that is non-responsive to active pings.

15 Claims, 17 Drawing Sheets

(56) References Cited

U.S. PATENT DOCUMENTS

| | | | |
|---|---|---|---|
| 2020/0204005 A1* | 6/2020 | Lee | H02J 50/60 |
| 2020/0251929 A1* | 8/2020 | Partovi | H01F 5/003 |
| 2021/0101680 A1* | 4/2021 | Naderi | H02J 50/402 |
| 2021/0210994 A1* | 7/2021 | Nerheim | H02J 7/0044 |
| 2021/0226480 A1* | 7/2021 | Goodchild | G01R 31/2825 |
| 2021/0249911 A1* | 8/2021 | Slatnick | H02J 50/402 |
| 2021/0384767 A1* | 12/2021 | Goodchild | H02J 50/402 |
| 2022/0052556 A1* | 2/2022 | Goodchild | H02J 50/12 |
| 2022/0052557 A1* | 2/2022 | Goodchild | H02J 50/402 |
| 2022/0052561 A1* | 2/2022 | Goodchild | H02J 50/60 |
| 2022/0069639 A1* | 3/2022 | Goodchild | H02J 50/80 |
| 2022/0149661 A1* | 5/2022 | Goodchild | H02J 50/005 |

* cited by examiner

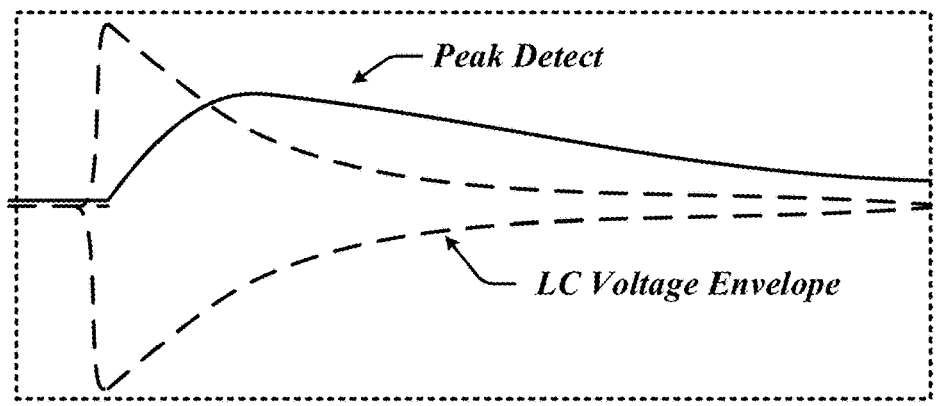
Unloaded LC Response
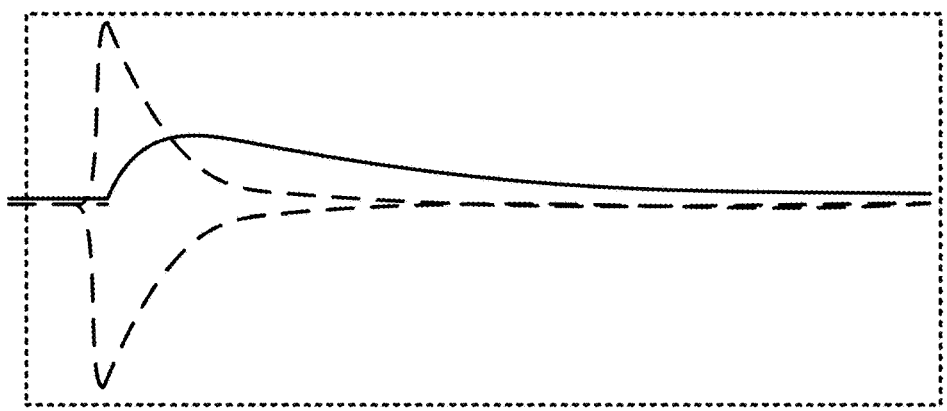
Response Affected by Non-Ferrous Object
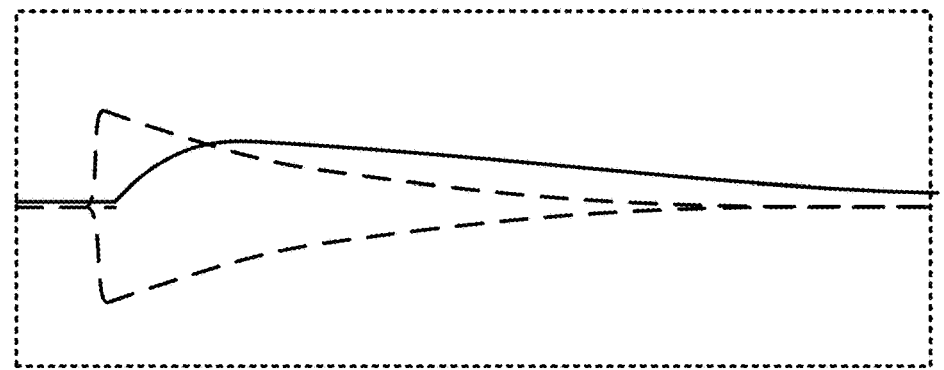
Response Affected by Proximate Receiver
*FIG. 8*

DIGITAL PING LOCKOUT IN A MULTI-COIL WIRELESS CHARGING DEVICE

PRIORITY CLAIM

This application claims priority to and the benefit of provisional patent application No. 62/938,308 filed in the United States Patent Office on Nov. 20, 2019 and of provisional patent application No. 63/066,315 filed in the United States Patent Office on Aug. 16, 2020, the entire content of these applications being incorporated herein by reference as if fully set forth below in their entirety and for all applicable purposes.

TECHNICAL FIELD

The present invention relates generally to wireless charging of batteries, including batteries in mobile computing devices, and more particularly to preventing recurring pings issued by a wireless charging device when a non-responsive device is placed on the wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a "Ping" to determine if a receiving device is present on or proximate to a transmitting coil in a base station for wireless charging. The transmitter coil has an inductance (L) and a resonant capacitor that has a capacitance (C) that is coupled to the transmitting coil to obtain a resonant LC circuit. A Ping is produced by delivering power to the resonant LC circuit. Power is applied for a duration of time while the transmitter listens for a response from a receiving device. Additionally, in multi-coil wireless charging devices, the ping may be used to determine an optimal combination of coils to use for charging a battery in the receiving device.

Improvements in wireless charging capabilities are required to support continually increasing complexity of mobile devices and changing form factors. For example, there is a need for a faster, lower power detection techniques that enable a charging device to detect and locate chargeable devices on a surface of a charging device, and to detect removal or relocation of a chargeable device during a wireless charging operation.

BRIEF DESCRIPTION OF THE DRAWINGS

FIG. 8 illustrates examples of observed differences in responses to a passive ping in accordance with certain aspects disclosed herein.

DETAILED DESCRIPTION

Figure 1:
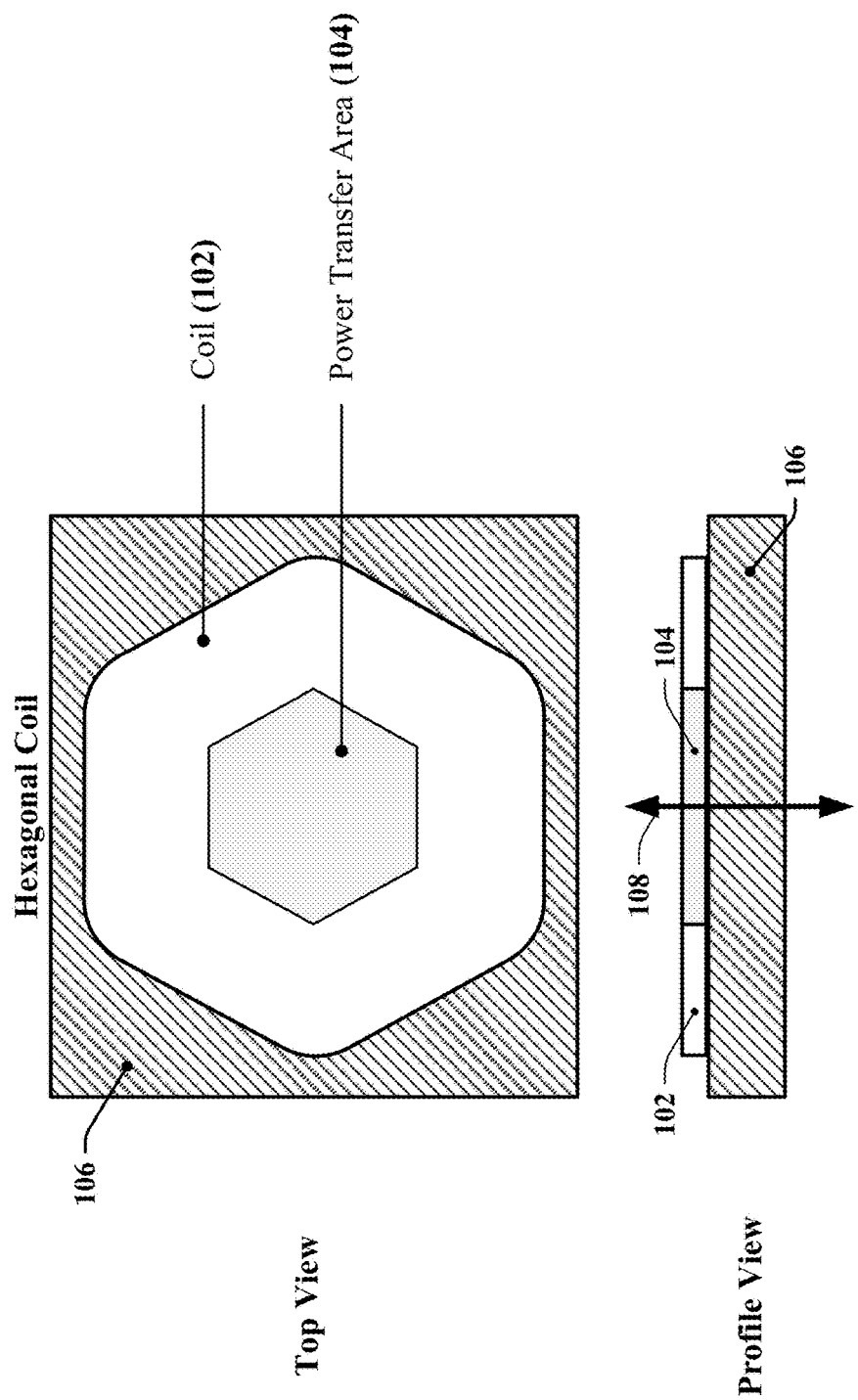
FIG. 1 illustrates an example of a charging cell that may be provided on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface in a charging device where the charging surface enables the charging device to charge one or more chargeable devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to the charging surface of the charging device without overlap of power transfer areas of the charging cells in the plurality of charging cells.

In some instances, the apparatus may also be referred to as a charging surface. Power can be wirelessly transferred to a receiving device located anywhere on a surface of the apparatus. The devices can have an arbitrarily defined size and/or shape and may be placed without regard to any discrete placement locations enabled for charging. Multiple devices can be simultaneously charged on a single charging surface. The apparatus can track motion of one or more devices across the charging surface.

Charging Cells

According to certain aspects disclosed herein, a charging surface may be provided using charging cells in a charging device, where the charging cells are deployed adjacent to the charging surface. In one example the charging cells are deployed in one or more layers of the charging surface in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell and directed along or proximate to a common axis.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically-defined charging cell. For example, a charging device may include multiple stacks of coils deployed across the charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
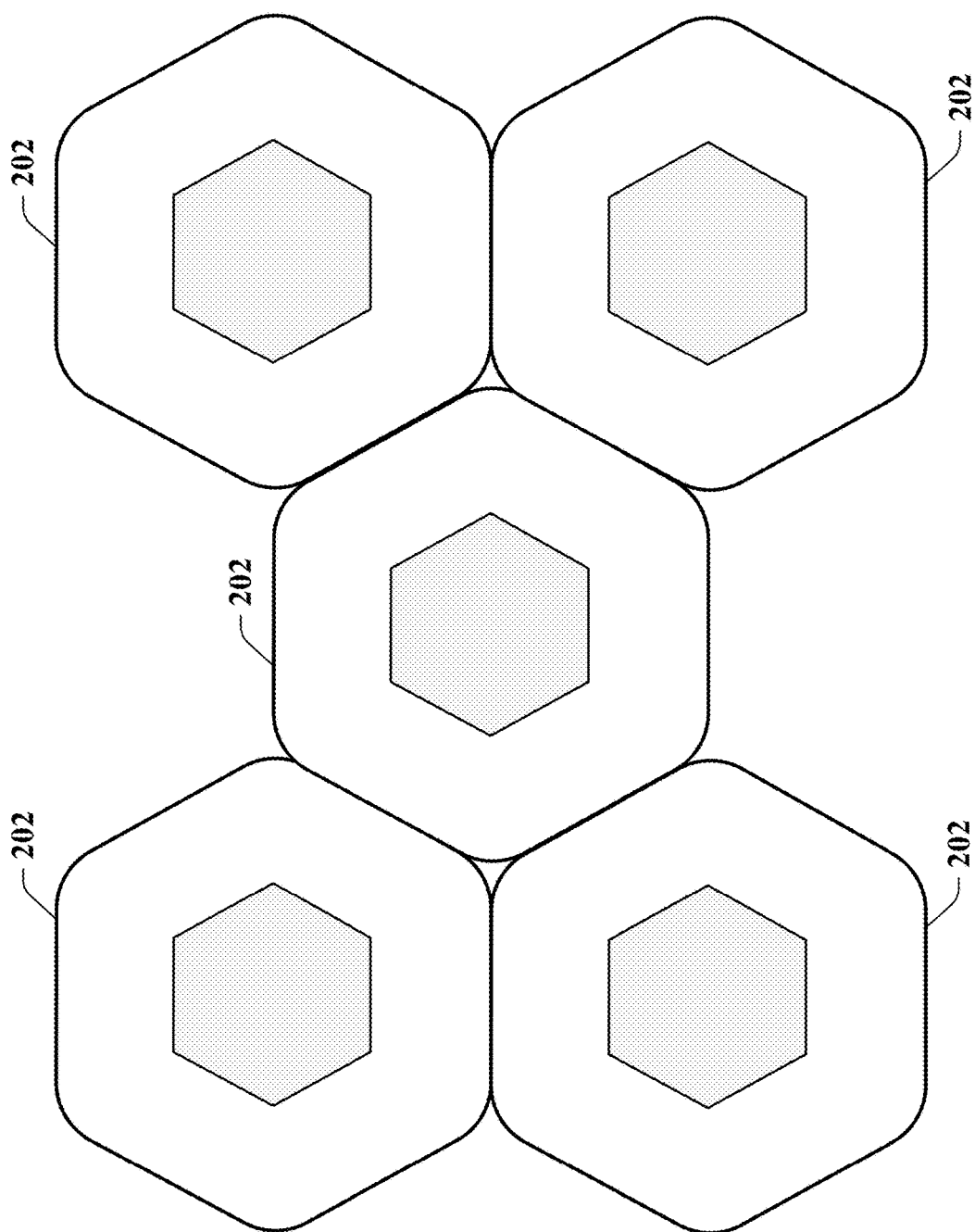
FIG. 2 illustrates an example of an arrangement of charging cells provided on a single layer of a segment of a charging surface provided by a wireless charging device in accordance with certain aspects disclosed herein.

FIG. 2 illustrates an example of an arrangement 200 of charging cells 202 provided on a single layer of a segment of a charging surface of a charging device that may be adapted in accordance with certain aspects disclosed herein. The charging cells 202 are arranged according to a honeycomb packaging configuration. In this example, the charging cells 202 are arranged end-to-end without overlap. This arrangement can be provided without through-hole or wire interconnects. Other arrangements are possible, including arrangements in which some portion of the charging cells 202 overlap. For example, wires of two or more coils may be interleaved to some extent.

Figure 3:
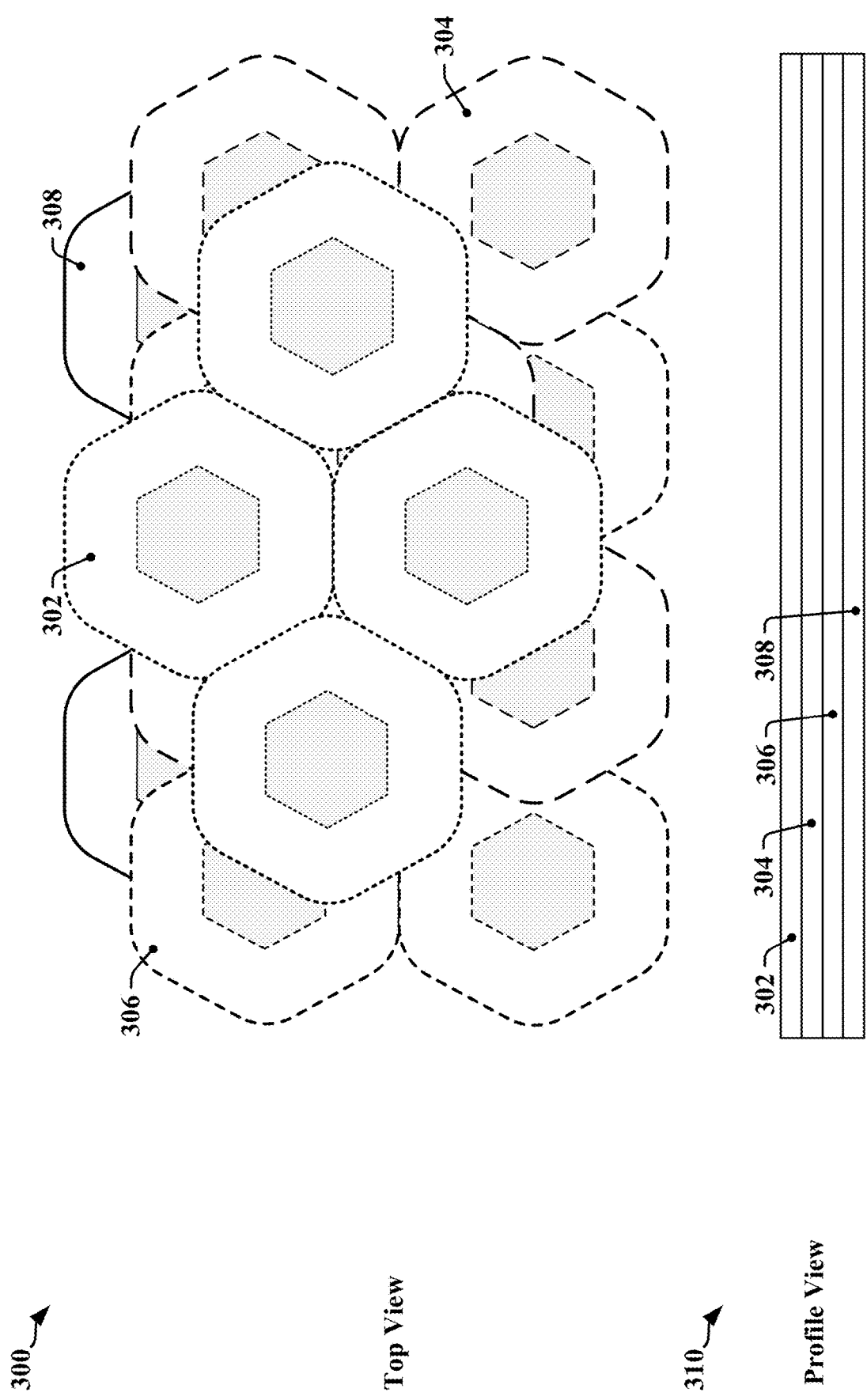
FIG. 3 illustrates an example of an arrangement of charging cells when multiple layers of charging cells are overlaid within a segment of a charging surface provided by a wireless charging device in accordance with certain aspects disclosed herein.

FIG. 3 illustrates an example of an arrangement of charging cells from two perspectives 300, 310 when multiple layers are overlaid within a segment of a charging surface that may be adapted in accordance with certain aspects disclosed herein. Layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
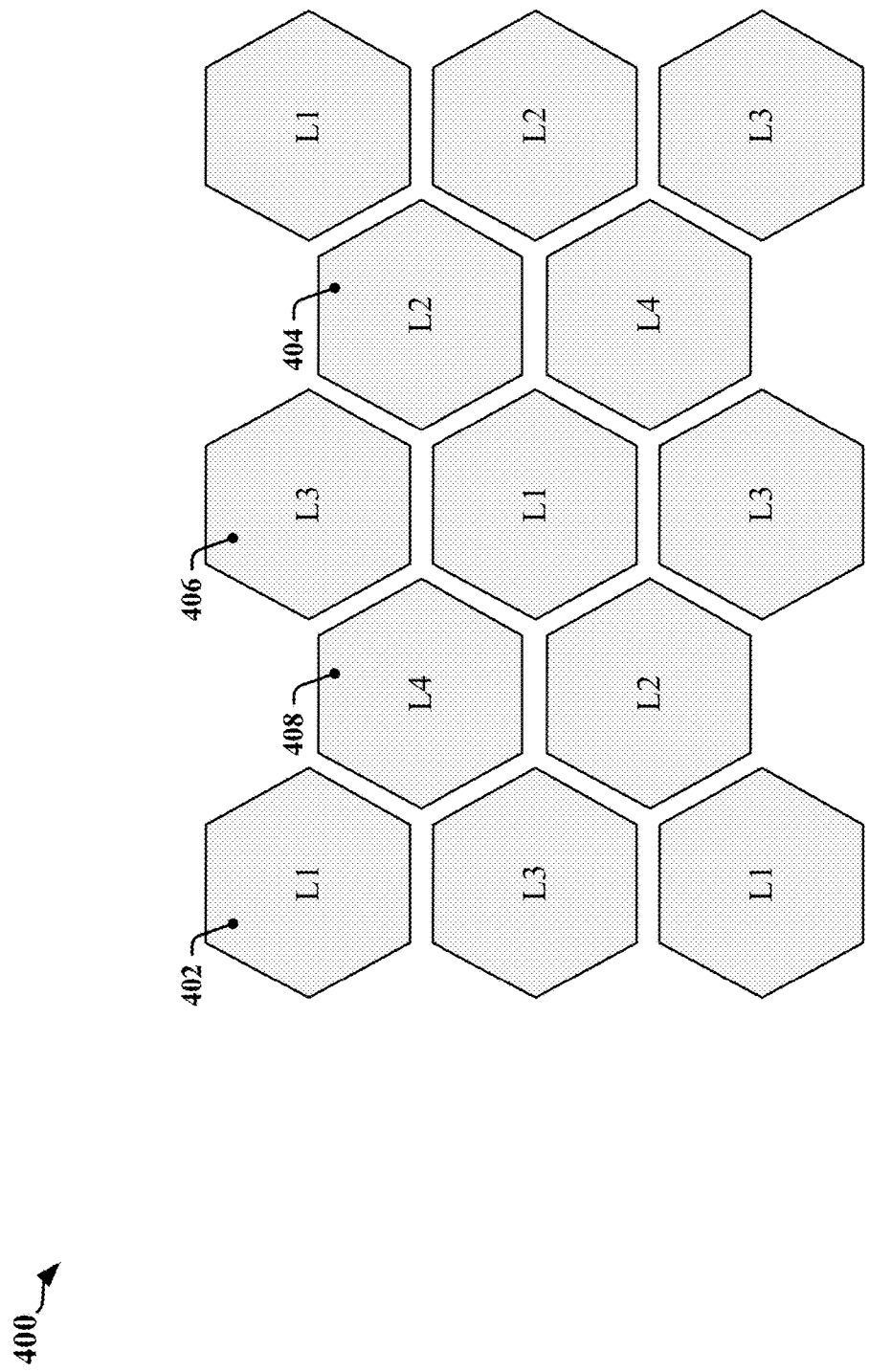
FIG. 4 illustrates the arrangement of power transfer areas provided by a charging surface of a charging device that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408, which may correspond to the layers of charging cells 302, 304, 306, 308 in FIG. 3. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
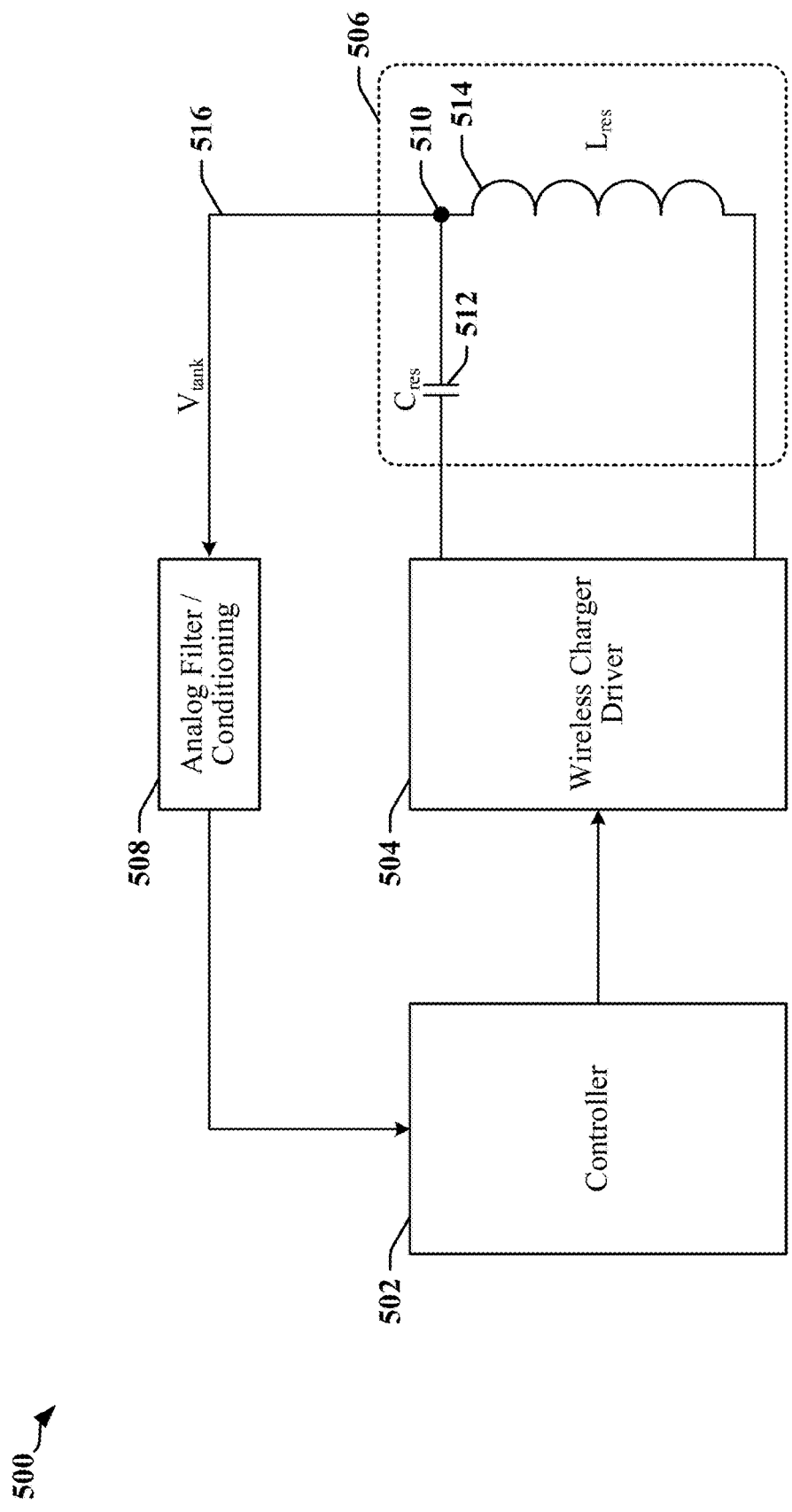
FIG. 5 illustrates a wireless transmitter that may be provided in a charger base station in accordance with certain aspects disclosed herein.

FIG. 5 illustrates a wireless transmitter 500 that may be provided in a charger base station. A controller 502 may receive a feedback signal that is filtered or otherwise processed by a conditioning circuit 508. The controller may control the operation of a driver circuit 504 that provides an alternating current to a resonant circuit 506 that includes a capacitor 512 and inductor 514. The resonant circuit 506 may also be referred to herein as a tank circuit, LC tank circuit, or LC tank, and the voltage 516 measured at an LC node 510 of the resonant circuit 506 may be referred to as the tank voltage.

The wireless transmitter 500 may be used by a charging device to determine if a compatible device has been placed on a charging surface. For example, the charging device may determine that a compatible device has been placed on the charging surface by sending an intermittent test signal (active ping or digital ping) through the wireless transmitter 500, where the resonant circuit 506 may detect or receive encoded signals when a compatible device responds to the test signal or modifies a characteristic of the test signal. The charging device may be configured to activate one or more coils in at least one charging cell after receiving a response signal defined by standard, convention, manufacturer or application. In some examples, the compatible device can respond to a ping by communicating received signal strength such that the charging device can find an optimal charging cell to be used for charging the compatible device.

Passive ping techniques may use the voltage and/or current measured or observed at the LC node 510 to identify the presence of a receiving coil in proximity to the charging pad of a device adapted in accordance with certain aspects disclosed herein. In many conventional wireless charger transmitters, circuits are provided to measure voltage at the LC node 510 or to measure the current in the LC network. These voltages and currents may be monitored for power regulation purposes or to support communication between devices. In the example illustrated in FIG. 5, voltage at the LC node 510 is monitored, although it is contemplated that current may additionally or alternatively be monitored to support passive ping in which a short pulse is provided to the resonant circuit 506. A response of the resonant circuit 506 to a passive ping (initial voltage $V_0$) may be represented by the voltage ($V_{LC}$) at the LC node 510, such that:

$$V_{LC} = V_0 e^{-\left(\frac{\omega}{2Q}\right)t}. \quad \text{(Eq. 1)}$$

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

Figure 6:
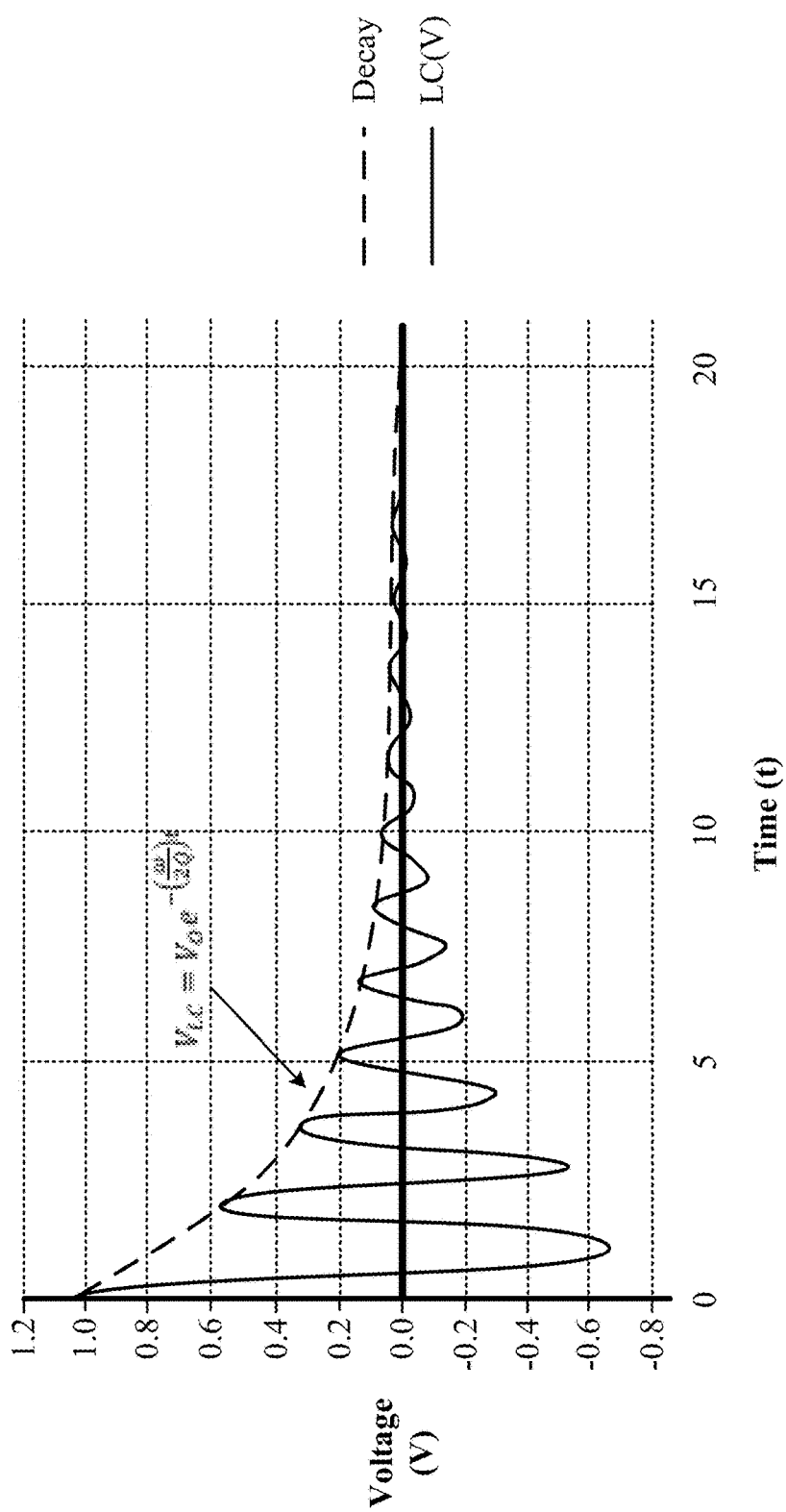
FIG. 6 illustrates a first example of a response to a passive ping in accordance with certain aspects disclosed herein.

FIG. 6 illustrates a first example in which a response 600 to a passive ping decays according to Equation 3. After the excitation pulse at time t=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The example illustrated in FIG. 6 represents a typical open or unloaded response when no object is present or proximate to the charging pad. In FIG. 6 the value of the Q factor is assumed to be 20.

Figure 7:
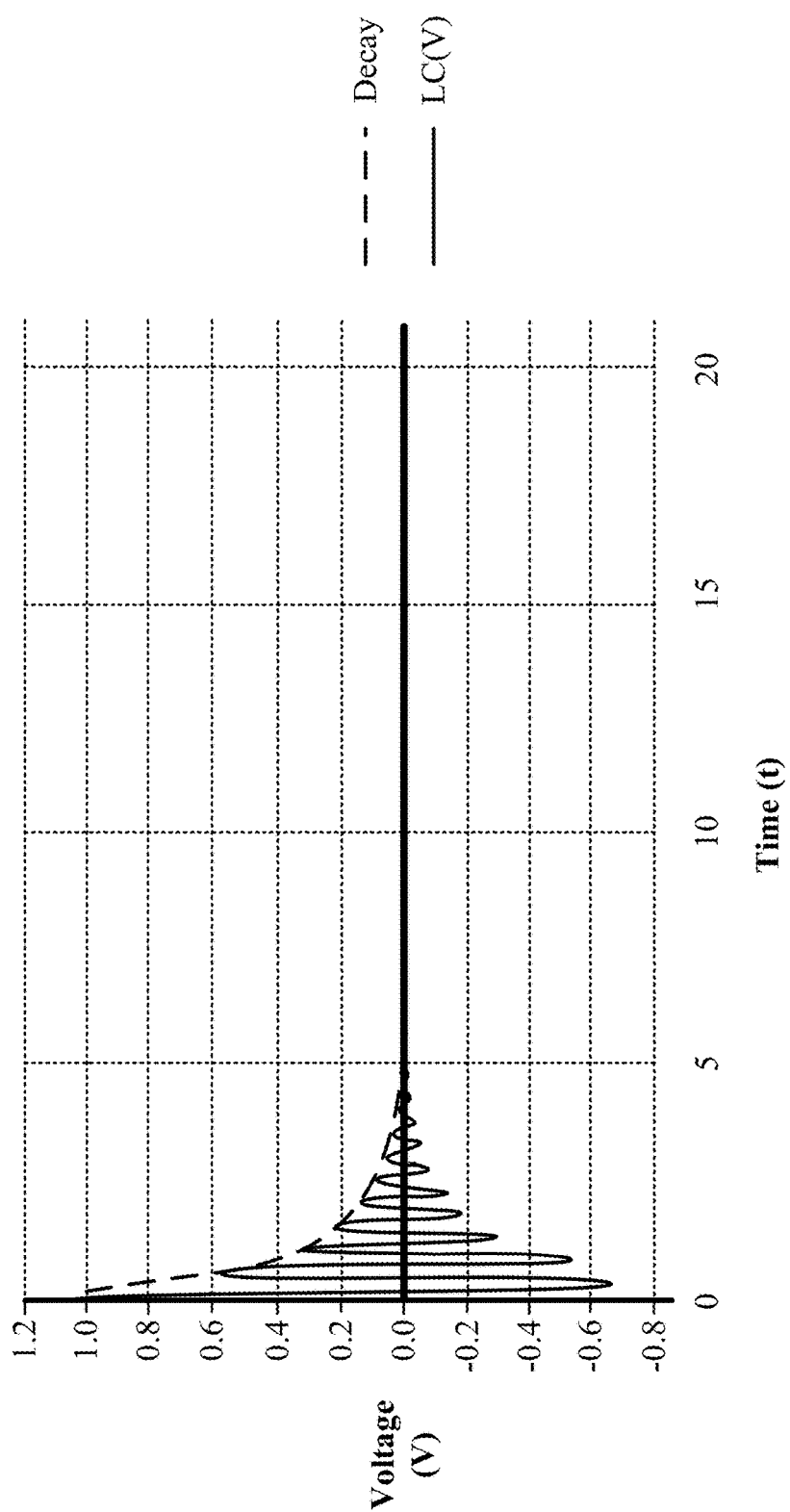
FIG. 7 illustrates a second example of a response to a passive ping in accordance with certain aspects disclosed herein.

FIG. 7 illustrates a second example in which a response 700 to a passive ping decays according to Equation 3. After the excitation pulse at time=0, the voltage and/or current is seen to oscillate at the resonant frequency defined by Equation 1, and with a decay rate defined by Equation 3. The first cycle of oscillation begins at voltage level $V_0$ and $V_{LC}$ continues to decay to zero as controlled by the Q factor and ω. The example illustrated in FIG. 7 represents a loaded response when an object is present or proximate to the charging pad loads the coil. In FIG. 6 the Q factor may have a value of 7. $V_{LC}$ oscillates at a higher frequency in the response 700 with respect to the response 600.

FIG. 8 illustrates a set of examples in which differences in responses 800, 820, 840 may be observed. A passive ping is initiated when a driver circuit 504 excites the resonant circuit 506 using a pulse that is shorter than 2.5 μs. Different types of wireless receivers and foreign objects placed on the transmitter result in different responses observable in the voltage at the LC node 510 or current in the resonant circuit 506 of the transmitter. The differences may indicate variations in the Q factor of the resonant circuit 506 frequency of the oscillation of $V_0$. Table 1 illustrates certain examples of objects placed on the charging pad in relation to an open state.

TABLE 1

| Object | Frequency | $V_{peak}$ (mV) | 50% Decay Cycles | Q Factor |
|---|---|---|---|---|
| None present | 96.98 kHz | 134 mV | 4.5 | 20.385 |
| Type-1 Receiver | 64.39 kHz | 82 mV | 3.5 | 15.855 |
| Type-2 Receiver | 78.14 kHz | 78 mV | 3.5 | 15.855 |
| Type-3 Receiver | 76.38 kHz | 122 mV | 3.2 | 14.496 |
| Misaligned Type-3 Receiver | 210.40 kHz | 110 mV | 2.0 | 9.060 |
| Ferrous object | 93.80 kHz | 110 mV | 2.0 | 9.060 |
| Non-ferrous object | 100.30 kHz | 102 mV | 1.5 | 6.795 |

In Table 1, the Q factor may be calculated as follows:

$$Q = \frac{\pi N}{\ln(2)} \cong 4.53N, \quad \text{(Eq. 2)}$$

where N is the number of cycles from excitation until amplitude falls below $0.5 V_0$.

Selectively Activating Coils

According to certain aspects disclosed herein, transmitting coils in one or more charging cells may be selectively activated to provide an optimal electromagnetic field for charging a compatible device. In some instances, transmitting coils may be assigned to charging cells, and some charging cells may overlap other charging cells. In the latter instances, the optimal charging configuration may be selected at the charging cell level. In other instances, charging cells may be defined based on placement of a device to be charged on a charging surface. In these other instances, the combination of coils activated for each charging event can vary. In some implementations, a charging device may include a driver circuit that can select one or more cells and/or one or more predefined charging cells for activation during a charging event.

Figure 9:
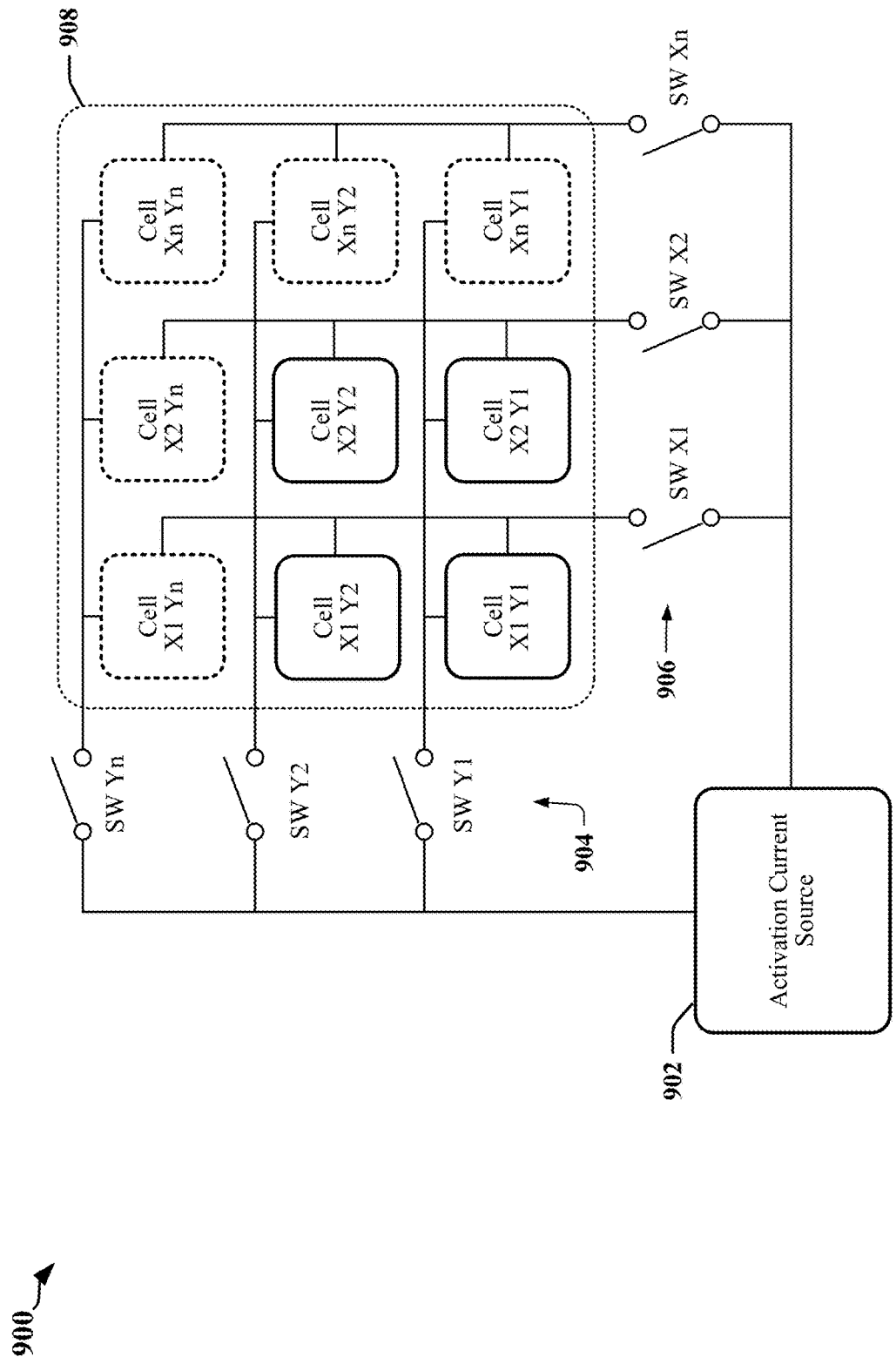
FIG. 9 illustrates a first topology that supports matrix multiplexing switching for use in a wireless charger adapted in accordance with certain aspects disclosed herein.

FIG. 9 illustrates a first topology 900 that supports matrix multiplexing switching for use in a wireless charger adapted in accordance with certain aspects disclosed herein. The wireless charger may select one or more charging cells 100 to charge a receiving device. Charging cells 100 that are not in use can be disconnected from current flow. A relatively large number of charging cells 100 may be used in the honeycomb packaging configuration illustrated in FIG. 2 requiring a corresponding number of switches. According to certain aspects disclosed herein, the charging cells 100 may be logically arranged in a matrix 908 having multiple cells connected to two or more switches that enable specific cells to be powered. In the illustrated topology 900, a two-dimensional matrix 908 is provided, where the dimensions may be represented by X and Y coordinates. Each of a first set of switches 906 is configured to selectively couple a first terminal of each cell in a column of cells to a wireless transmitter and/or receiver circuit 902 that provide current to activate coils during wireless charging. Each of a second set of switches 904 is configured to selectively couple a second terminal of each cell in a row of cells to the wireless transmitter and/or receiver circuit 902. A cell is active when both terminals of the cell are coupled to the wireless transmitter and/or receiver circuit 902.

The use of a matrix 908 can significantly reduce the number of switching components needed to operate a network of tuned LC circuits. For example, N individually connected cells require at least N switches, whereas a two-dimensional matrix 908 having N cells can be operated with √N switches. The use of a matrix 908 can produce significant cost savings and reduce circuit and/or layout complexity. In one example, a 9-cell implementation can be implemented in a 3×3 matrix 908 using 6 switches, saving 3 switches. In another example, a 16-cell implementation can be implemented in a 4×4 matrix 908 using 8 switches, saving 8 switches.

During operation at least 2 switches are closed to actively couple one coil to a wireless transmitter and/or receiver circuit 902. Multiple switches can be closed at once in order to facilitate connection of multiple coils to the wireless transmitter and/or receiver circuit 902. Multiple switches may be closed, for example, to enable modes of operation that drive multiple transmitting coils when transferring power to a receiving device.

Figure 10:
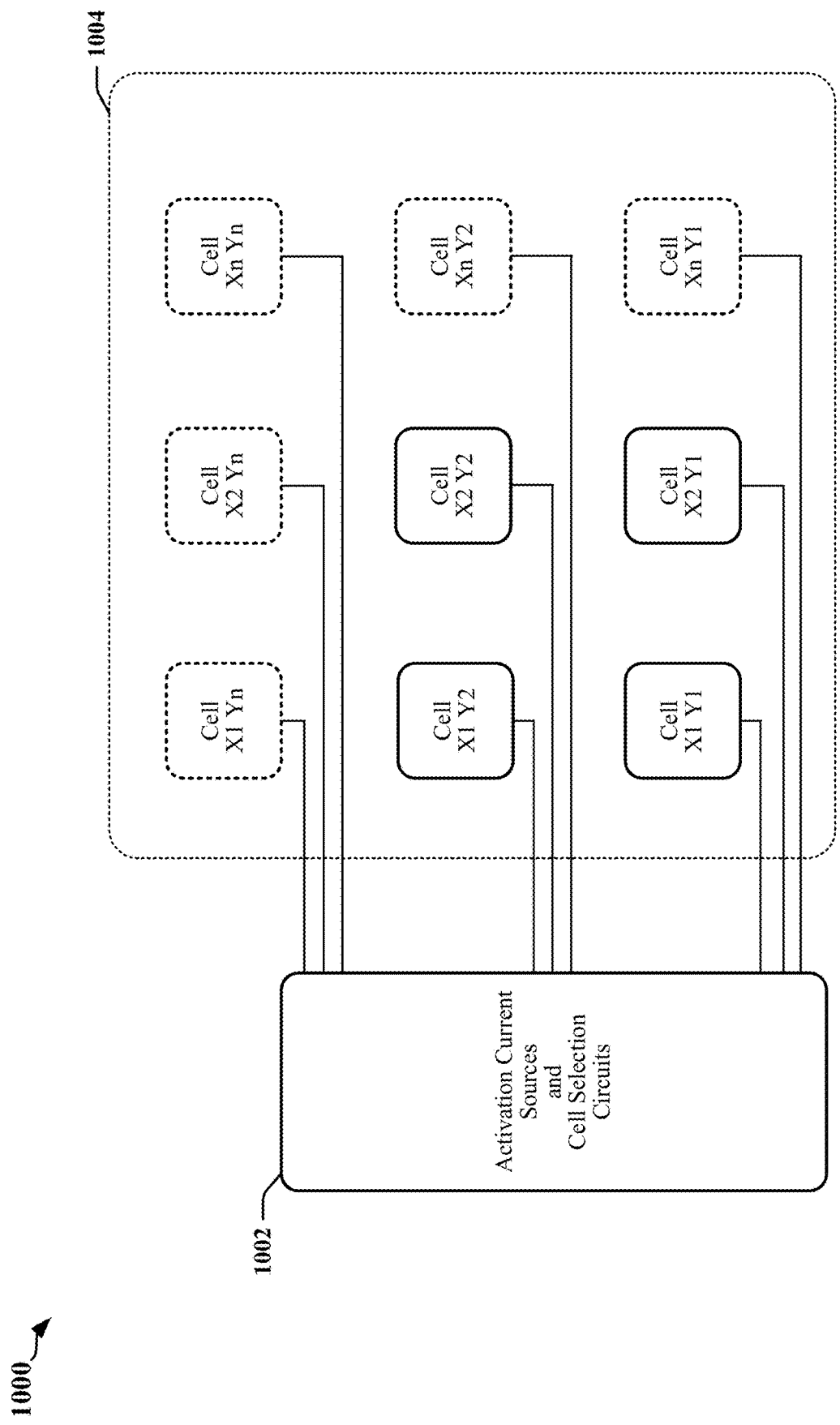
FIG. 10 illustrates a second topology that supports direct current drive in a wireless charger adapted in accordance with certain aspects disclosed herein.

FIG. 10 illustrates a second topology 1000 in which each coil or charging cell is individually and/or directly driven by a driver circuit 1002 in accordance with certain aspects disclosed herein. The driver circuit 1002 may be configured to select one or more coils or charging cells 100 from a group of coils 1004 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or a group of coils to be used during a charging event and a second switching matrix (see, e.g., FIG. 9) may be used to activate the charging cell and/or a group of selected coils.

Detecting Device Removal from a Multi-Coil Wireless Charger

Figure 11:
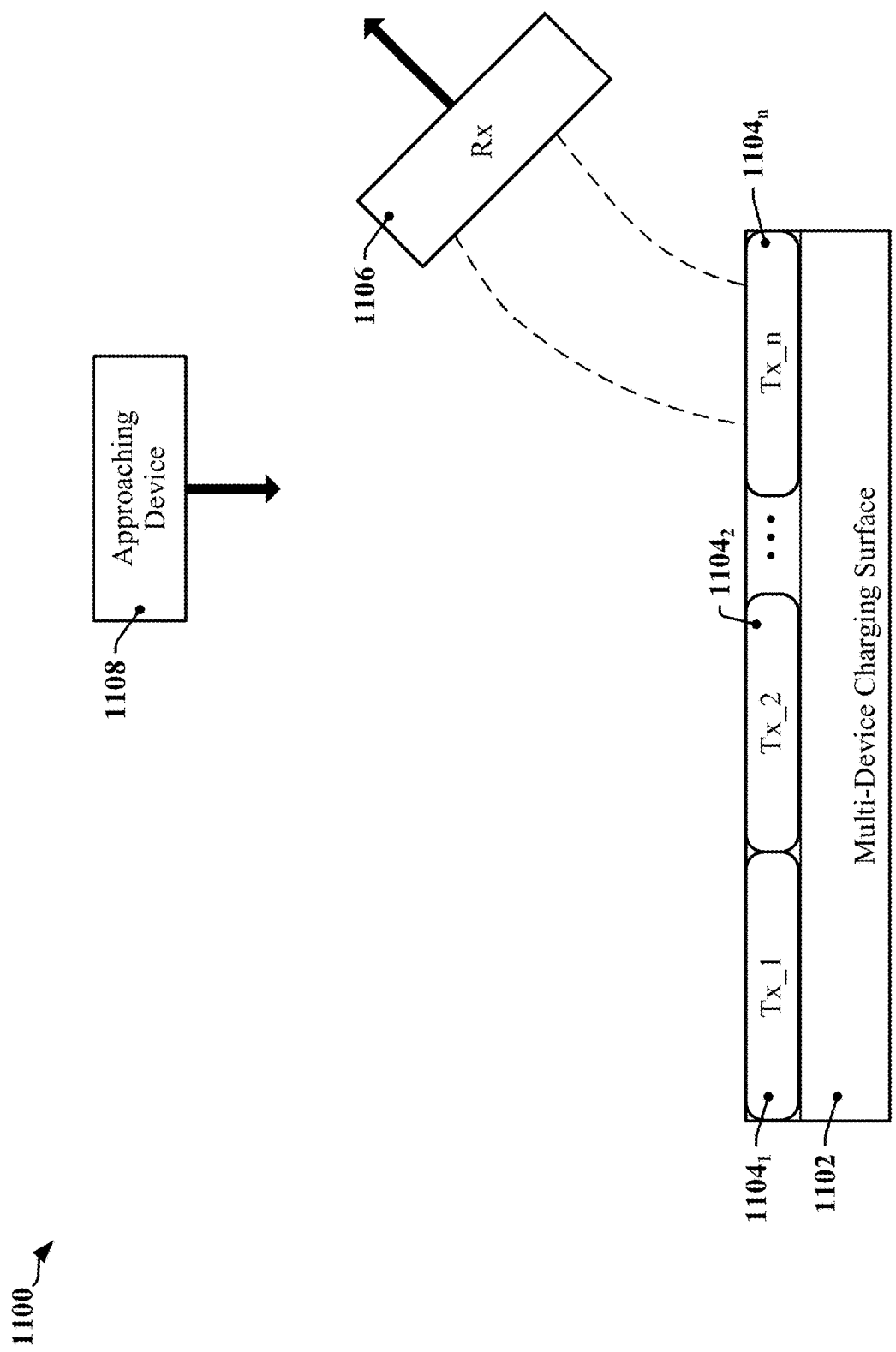
FIG. 11 illustrates a multi-coil wireless charging system configured to reliably detect removal of a receiving device in accordance with certain aspects of this disclosure.

With reference now to FIG. 11, a multi-coil wireless charging system 1100 provided in accordance with certain aspects of this disclosure can be configured to reliably detect removal of a receiving device 1106 while charging is in progress. Arbitrary and/or unanticipated removal of the receiving device can cause damage to other receiving devices 1108, in addition to potential loss of detection efficiency for an approaching device 1108. The multi-coil wireless charging system 1100 provides a charging surface 1102 that includes multiple transmitting coils $1104_1$-$1104_n$. In the illustrated example, a receiving device 1106 is removed while receiving a charging flux from the $n^{th}$ transmitting coil (transmitting coil $1104_n$).

In some instances, the charging surface 1102 continues to provide a charging current to the transmitting coil $1104_n$ after the receiving device 1106 has been removed. The approaching device 1108 may be placed on the charging surface 1102 while the charging current is flowing. The charging current is typically configured based on the capabilities of the receiving device 1106, which may differ from the capabilities of the approaching device 1108. Damage to the approaching device 1108 can occur if the approaching device 1108 is not designed to handle the level of induced current intended for the original receiving device 1106.

Certain aspects of this disclosure enable the multi-coil wireless charging system 1100 to rapidly and reliably detect the removal of the receiving device 1106 from the charging surface 1102. The multi-coil wireless charging system 1100 may discontinue the flow of the charging current to the active transmitting coil $1104_n$ upon detecting the removal of the receiving device 1106. The multi-coil wireless charging system 1100 may configure the charging surface 1102 to detect objects, including the approaching device 1108 upon detecting the removal of the receiving device 1106 and discontinuation of the charging current.

According to certain aspects of the disclosure, removal of the receiving device 1106 may be detected by monitoring charging circuits, or certain characteristics of one or more of the transmitting coils $1104_1$-$1104_n$. In certain examples, the removal of the receiving device 1106 may be detected based on changes in measured electrical quantities that can be attributed to changes in electromagnetic coupling between the transmitting coil $1104_n$ and a receiving coil in the receiving device 1106.

In one example, Dynamic Inferred Coupling Estimation (DICE) may be used to detect quality of coupling in real-time. DICE may include an evaluation of the ratio of real power to reactive power in a circuit that includes a transmitting coil and series resonant capacitor. The amount of reactive power stored in the inductor-capacitor (LC) circuit of the transmitter is substantially influenced by the coupling coefficient. The coupling coefficient defines the ratio of mutual inductance to leakage inductance in the LC circuit of the wireless transmitter. For example, leakage inductance in the LC circuit of the wireless transmitter may be expressed as:

$$Tx_{leakage} = L_{Tx} \times (1-k), \qquad \text{(Eq. 3)}$$

where $L_{Tx}$ represents the self-inductance of the transmitter coil, and k represents the coupling coefficient. Decreasing coupling reduces coupling coefficient and increases leakage inductance, resulting in more reactive energy being stored in the leakage inductance of the transmitter. Energy stored in the leakage inductance does not contribute to power transfer and, as energy builds up in the leakage inductance, the voltage at the LC node increases.

Certain aspects of the coupling between one or more transmitting coils $1104_1$-$1104_n$ and a receiving device 1106 may be characterized by voltage measured at the LC node. Voltage measurements taken at the LC node may be available for other reasons. In some instances, voltage at the LC node may be monitored as an overvoltage indicator used to protect power electronics and the resonant capacitor. In one example, the measurement circuit includes a voltage comparator configured to detect voltages exceeding a threshold level. According to certain aspects disclosed herein, a measurement circuit may be added, or an existing measurement circuit may be used to quantify or compare a voltage at the LC node that varies directly with the quality of coupling.

Detecting Device Removal From A Multi-Coil Wireless Charger

With reference now to FIG. 11, a multi-coil wireless charging system 1100 provided in accordance with certain aspects of this disclosure can be configured to reliably detect removal of a receiving device 1106 while charging is in progress. Arbitrary and/or unanticipated removal of the receiving device can cause damage to other receiving devices 1108, in addition to potential loss of detection efficiency for an approaching device 1108. The multi-coil wireless charging system 1100 provides a charging surface 1102 that includes multiple transmitting coils $1104_1$-$1104_n$. In the illustrated example, a receiving device 1106 is removed while receiving a charging flux from the $n^{th}$ transmitting coil (transmitting coil $1104_n$).

In some instances, the charging surface 1102 continues to provide a charging current to the transmitting coil $1104_n$ after the receiving device 1106 has been removed. The approaching device 1108 may be placed on the charging surface 1102 while the charging current is flowing. The charging current is typically configured based on the capabilities of the receiving device 1106, which may differ from the capabilities of the approaching device 1108. Damage to the approaching device 1108 can occur if the approaching device 1108 is not designed to handle the level of induced current intended for the original receiving device 1106.

Certain aspects of this disclosure enable the multi-coil wireless charging system 1100 to rapidly and reliably detect the removal of the receiving device 1106 from the charging surface 1102. The multi-coil wireless charging system 1100 may discontinue the flow of the charging current to the active transmitting coil $1104_n$ upon detecting the removal of the receiving device 1106. The multi-coil wireless charging system 1100 may configure the charging surface 1102 to detect objects, including the approaching device 1108 upon detecting the removal of the receiving device 1106 and discontinuation of the charging current.

According to certain aspects of the disclosure, removal of the receiving device 1106 may be detected by monitoring charging circuits, or certain characteristics of one or more of the transmitting coils $1104_1$-$1104_n$. In certain examples, the removal of the receiving device 1106 may be detected based on changes in measured electrical quantities that can be attributed to changes in electromagnetic coupling between the transmitting coil $1104_n$ and a receiving coil in the receiving device 1106.

Passive and Active Ping

Figure 12:
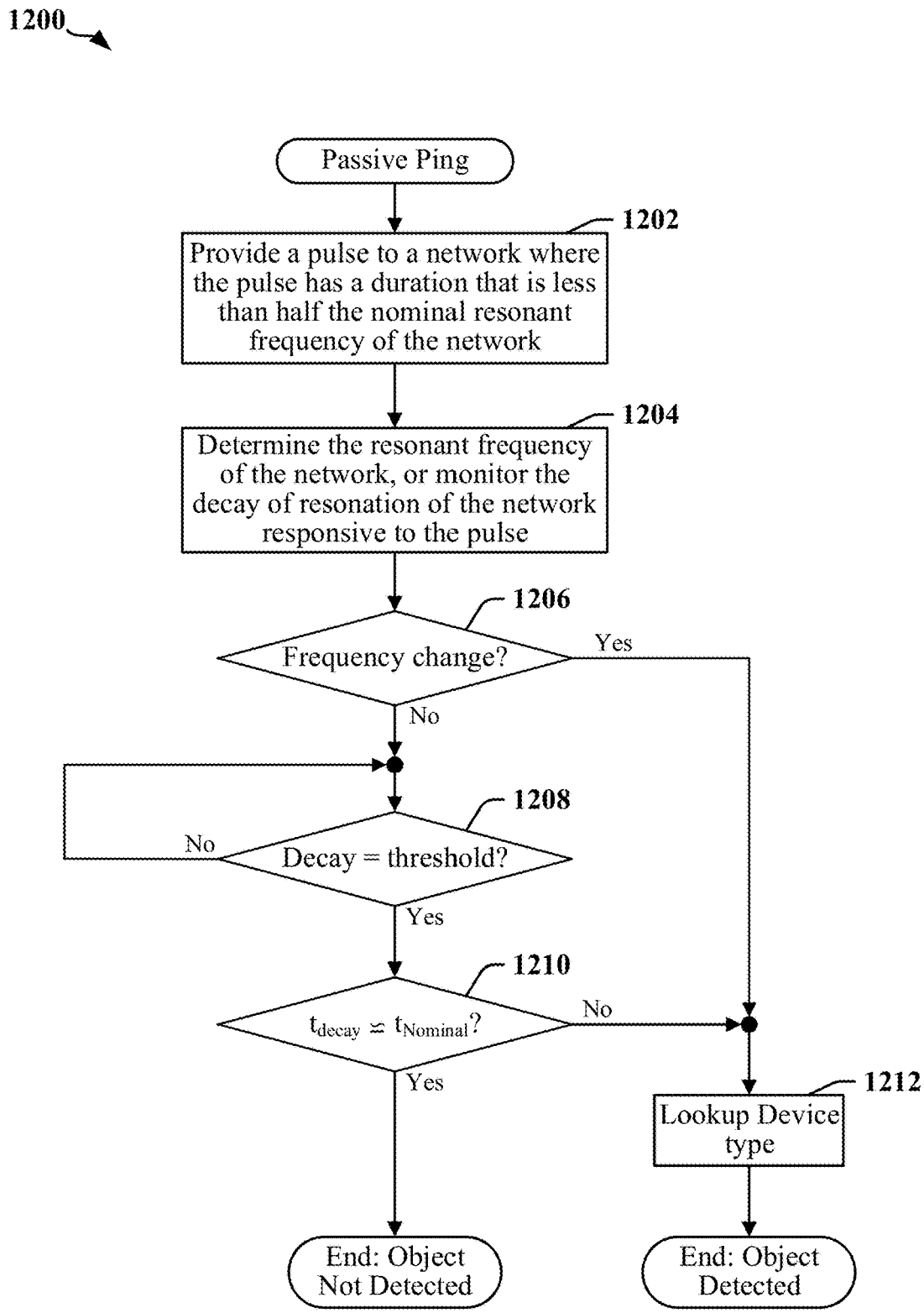
FIG. 12 is a flowchart that illustrates a method involving passive ping implemented in a wireless charging device adapted in accordance with certain aspects disclosed herein.

FIG. 12 is a flowchart 1200 that illustrates a method involving passive ping implemented in a wireless charging device adapted in accordance with certain aspects disclosed herein. At block 1202, a controller may generate a short excitation pulse and may provide the short excitation pulse to a network that includes a resonant circuit. The network may have a nominal resonant frequency and the short excitation pulse may have a duration that is less than half the period of the nominal resonant frequency of the network. In other examples, the short excitation pulse may have a duration corresponding to multiple cycles of the resonant frequency of the network. The nominal resonant frequency may be observed when the transmitting coil of the resonant circuit is isolated from external objects, including ferrous objects, non-ferrous objects and/or receiving coils in a device to be charged.

At block 1204, the controller may determine the resonant frequency of the network or may monitor the decay of resonation of the network responsive to the pulse. According to certain aspects disclosed herein, the resonant frequency and/or the Q factor associated with the network may be altered when a device or other object is placed in proximity to the transmitting coil. The resonant frequency may be increased or decreased from the nominal resonant frequency observed when the transmitting coil of the resonant circuit is isolated from external objects. The Q factor of the network may be increased or decreased with respect to a nominal Q factor measurable when the transmitting coil of the resonant circuit is isolated from external objects. According to certain aspects disclosed herein, the duration of delay can be indicative of the presence or type of an object placed in proximity to the transmitting coil when differences in Q factor prolong or accelerate decay of amplitude of oscillation in the resonant circuit with respect to delays associated with a nominal Q factor.

In one example, the controller may determine the resonant frequency of the network using a transition detector circuit configured to detect zero crossings of a signal representative of the voltage at the LC node 510 using a comparator or the like. In some instances, direct current (DC) components may be filtered from the signal to provide a zero crossing. In some instances, the comparator may account for a DC component using an offset to detect crossings of a common voltage level. A counter may be employed to count the detected zero crossings. In another example, the controller may determine the resonant frequency of the network using a transition detector circuit configured to detect crossings through a threshold voltage by a signal representative of the voltage at the LC node 510, where the amplitude of the signal is clamped or limited within a range of voltages that can be detected and monitored by logic circuits. In this example, a counter may be employed to count transitions in the signal. The resonant frequency of the network may be measured, estimated and/or calculated using other methodologies.

In another example, a timer or counter may be employed to determine the time elapsed for VLC to decay from voltage level V0 to a threshold voltage level. The elapsed time may be used to represent a decay characteristic of the network. The threshold voltage level may be selected to provide sufficient granularity to enable a counter or timer to distinguish between various responses 800, 820, 840 to the pulse. VLC may be represented by detected or measured peak, peak-to-peak, envelope and/or rectified voltage level. The decay characteristic of the network may be measured, estimated and/or calculated using other methodologies.

If at block 1206, the controller determines that a change in resonant frequency with respect to a nominal resonant frequency indicate presence of an object in proximity to the transmitting coil, the controller may attempt to identify the object at block 1212. If the controller determines at block 1206 that resonant frequency is substantially the same as the nominal resonant frequency, the controller may consider the decay characteristic of the amplitude of oscillation in the resonant circuit at block 1208. The controller may determine that the resonant frequency of the network is substantially the same as the nominal resonant frequency when the frequency remains within a defined frequency range centered on, or including the nominal resonant frequency. In some implementations, the controller may identify objects using changes in resonant frequency and decay characteristics. In these latter implementations, the controller may continue at block 1208 regardless of resonant frequency, and may use changes in change in resonant frequency as an additional parameter when identifying an object positioned proximately the transmission coil.

At block 1208, the controller may use a timer and/or may count the cycles of the oscillation in the resonant circuit that have elapsed between the initial V0 amplitude and a threshold amplitude used to assess the decay characteristic. In one example, V0/2 may be selected as the threshold amplitude. At block 1210, the number of cycles or the elapsed time between the initial V0 amplitude and the threshold amplitude may be used to characterize decay in the amplitude of oscillation in the resonant circuit, and to compare the characterize decay with a corresponding nominal decay characteristic. If at block 1210, no change in frequency and delay characteristic is detected, the controller may terminate the procedure with a determination that no object is proximately located to the transmission coil. If at block 1210, a change in frequency and/or delay characteristic has been detected, the controller may identify the object at block 1212.

At block 1212, the controller may be configured to identify receiving devices placed on a charging pad that includes a charging surface. The controller may be configured to ignore other types of objects, or receiving devices that are not optimally placed on the charging pad including, for example, receiving devices that are misaligned with the transmission coil that provides the passive ping. In some implementations, the controller may use a lookup table indexed by resonant frequency, decay time, change in resonant frequency, change in decay time and/or Q factor estimates. The lookup table may provide information identifying specific device types, and/or charging parameters to be used when charging the identified device or type of device.

Passive ping uses a very short excitation pulse that can be less than a half-cycle of the nominal resonant frequency observed at the LC node 510 in the resonant circuit 906. A conventional ping may actively drive a transmission coil for more than 16,000 cycles. The power and time consumed by a conventional ping can exceed the power and time use of a passive ping by several orders of magnitude. In one example, a passive ping consumes approximately 0.25 µJ per ping with a max ping time of around ~100 µs, while a conventional active ping consumes approximately 80 mJ per ping with a max ping time of around 90 ms. In this example, energy dissipation may be reduced by a factor of 320,000 and the time per ping may be reduced by a factor of 900. In other examples, an excitation pulse that can have a duration corresponding to multiple cycles, but less than 30 cycles of the nominal resonant frequency observed at the LC node 510 in the resonant circuit 906. In one example, a multi-cycle excitation pulse has a duration that is less than 10 cycles.

Passive ping may also be coupled with another, reduced-power sensing methodology, such as capacitive sensing.

Figure 14:
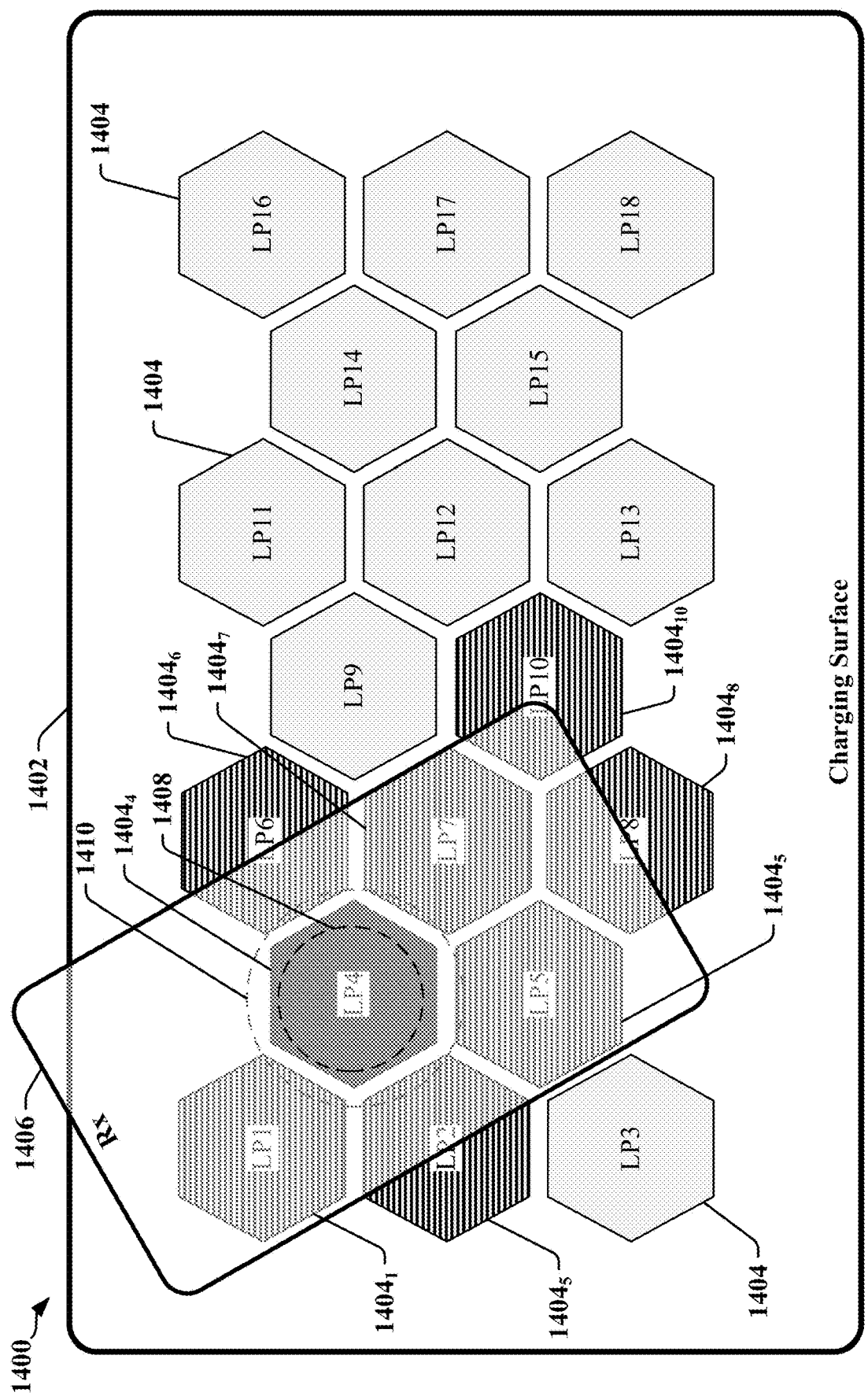
FIG. 14 illustrates an example of a situation with a receiving device located proximate to a wireless charging device that may give rise to utilization of digital ping lockout.

Capacitive sensing or the like can provide an ultra-low power detection method that determines presence or non-presence of an object is in proximity to the charging surface. After capacitive sense detection, a passive ping can be transmitted sequentially or concurrently on each coil to produce a more accurate map of where a potential receiving device and/or object is located. After a passive ping procedure has been conducted, an active ping (e.g., active digital ping) may be provided in the most likely device locations. An example algorithm for device location sensing, identification and charging is illustrated in FIG. 14.

Figure 13:
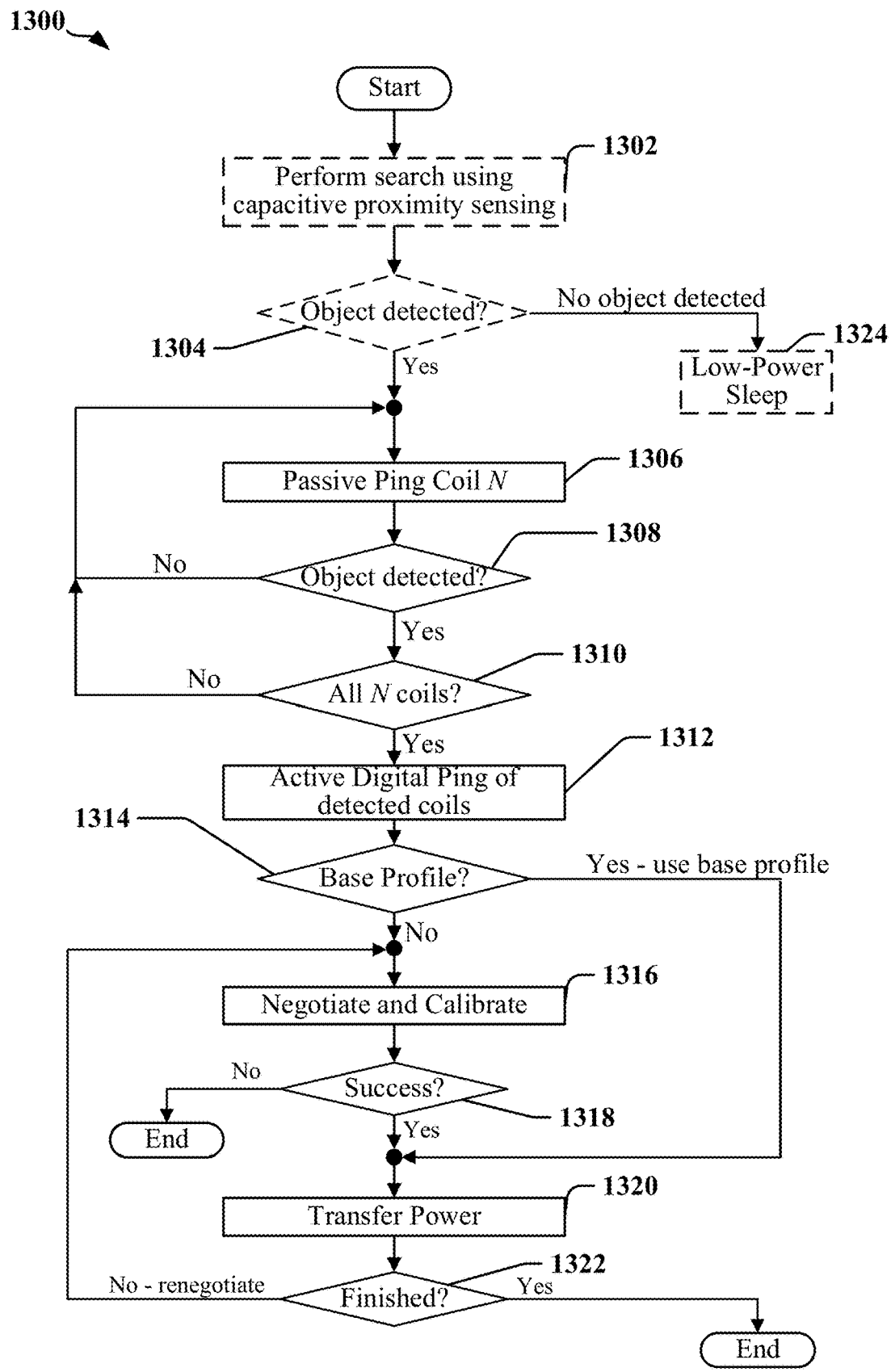
FIG. 13 is a flowchart that illustrates a power transfer management procedure that may be employed by a wireless charging device implemented in accordance with certain aspects disclosed herein.

FIG. 13 is a flowchart 1300 that illustrates a power transfer management procedure involving multiple sensing and/or interrogation techniques that may be employed by a wireless charging device implemented in accordance with certain aspects disclosed herein. The procedure may be initiated periodically and, in some instances, may be initiated after the wireless charging device exits a low-power or sleep state. In one example, the procedure may be repeated at a frequency calculated to provide sub-second response to placement of a device on a charging pad. The procedure may be re-entered when an error condition has been detected during a first execution of the procedure, and/or after charging of a device placed on the charging pad has been completed.

At block 1302, a controller may perform an initial search using capacitive proximity sensing. Capacitive proximity sensing may be performed quickly and with low power dissipation. In one example, capacitive proximity sensing may be performed iteratively, where one or more transmission coils is tested in each iteration. The number of transmission coils tested in each iteration may be determined by the number of sensing circuits available to the controller. At block 1304, the controller may determine whether capacitive proximity sensing has detected the presence or potential presence of an object proximate to one of the transmission coils. If no object is detected by capacitive proximity sensing, the controller may cause the charging device to enter a low-power, idle and/or sleep state at block 1324. If an object has been detected, the controller may initiate passive ping sensing at block 1306.

At block 1306, the controller may initiate passive ping sensing to either detect (in the case where capacitive sensing is not used) or to confirm the presence of (in the case where capacitive sensing is not used) an object near one or more N transmission coils, and/or to evaluate the nature of the proximately-located object. Passive ping sensing may consume a similar quantity of power but span a greater of time than capacitive proximity sensing. In one example, each passive ping can be completed in approximately 100 μs and may expend 0.25 μJ. A passive ping may be provided to each transmission coil identified as being of interest by capacitive proximity sensing. In some implementations, a passive ping may be provided to transmission coils near each transmission coil identified as being of interest by capacitive proximity sensing, including overlaid transmission coils. At block 1308, the controller may determine whether passive ping sensing has detected the presence of a potentially chargeable device proximate to one of the transmission coils that may be a receiving device. If no potential chargeable device has been detected, passive ping sensing may continue at block 1306 to test a next coil in N number of coils. Passive ping sensing continues until all N coils are tested as illustrated by decision block 1308. In one example, the controller terminates passive ping sensing after all transmitting coils have been tested. After all N coils (or a determined subset of the N coils in other examples) have been tested as shown by decision block 1310, the controller may initiate active digital ping sensing for all coils detecting an object as shown at block 1312. In other aspects, passive ping sensing may be resumed after the results of an active ping have been obtained.

At block 1312, the controller may use an active ping to interrogate a potentially chargeable device. The active ping may be provided to a transmitting coil identified by passive ping sensing. In one example, a standards-defined active ping exchange can be completed in approximately 90 ms and may expend 80 mJ. An active ping may be provided to each transmission coil associated with a potentially chargeable device.

At block 1312, the controller may further identify and configure a chargeable device. The active ping provided at block 1312 may be configured to stimulate a chargeable device such that it transmits a response that includes information identifying the chargeable device. In some instances, the controller may fail to identify or configure a potentially chargeable device detected by passive ping, and the controller may resume a search based on passive ping at block 1306. At block 1314, the controller may determine whether a baseline charging profile or negotiated charging profile should be used to charge an identified chargeable device. The baseline, or default charging profile may be defined by standards. In one example, the baseline profile limits charging power to 5 W. In another example, a negotiated charging profile may enable charging to proceed at up to 15 W. When a baseline charging profile is selected, the controller may begin transferring power (charging) at block 1320.

At block 1316, the controller may initiate a standards-defined negotiation and calibration process that can optimize power transfer. The controller may negotiate with the chargeable device to determine an extended power profile that is different from a power profile defined for the baseline charging profile. The controller may determine at block 1318 that the negotiation and calibration process has failed and may terminate the power transfer management procedure. When the controller determines at block 1318 that the negotiation and calibration process has succeeded, charging in accordance with the negotiate profile may commence at block 1320.

At block 1322, the controller may determine whether charging has been successfully completed. In some instances, an error may be detected when a negotiated profile is used to control power transfer. In the latter instance, the controller may attempt to renegotiate and/or reconfigure the profile at block 1316. The controller may terminate the power transfer management procedure when charging has been successfully completed.

Digital Ping Lockout

When a portion of a receive device (e.g., a frame portion of the device that is not proximate to a charging coil of the device) or other non-receiver objects overlay a multi-coil pad charging surface, such portions or objects can trigger reoccurring digital or active pings after detection of device portions or other non-receiver objects. As these portions or objects are non-receiving they will never yield a ping response to the active or digital pings. These digital pings may create extra signal noise and also waste power. They can also contribute to unwanted and even deleterious heating of the object if the repeating of the digital ping is frequent enough. Accordingly, the present disclosure provides for a digital ping lockout process in which the occurrence of a succession of multiple pings are monitored, and when the pings do not receive a ping response from a detected receiver or object (e.g., a non-acknowledgement (NACK)) after some predetermined time or count of pings, will cease digital pinging (i.e., lockout of digital pinging to the object) to avoid signal noise, wasted power, and unwanted heating of the object.

FIG. 14 illustrates an example scenario in which unnecessary digital pinging may occur in a wireless charging device 1400. As shown, the wireless charging device 1400 includes a charging surface 1402 that includes a number of charging coils (or charging cells) 1404. In this example, there are 18 coils 1404 labeled LP1 through LP18.

Also illustrated is a receiving (Rx) device 1406, such as an electronic device capable of wireless charging. In other examples, however, the device 1406 might be a non-receiving device altogether that is detectable with a passive or analog ping, but not capable of providing a ping response or acknowledgement (ACK). Additionally, in the case that the Rx device 1406 is a device capable of wireless charging, a coil 1408 within the device 1406 may be located proximate to one of the coils LP4 (also denoted with $1404_4$) that is used for supplying charging energy to the device 1406. Additionally, a range or area 1410 is illustrated to show the area over which the coil 1408 might be able to receive and respond to digital or active pings from the coil $1404_4$. Outside of this area 1410, other coils of the charging device 1400 may be covered by portions of the receiving device 1406 that will be detected by passive or analog pinging from the coils 1404, but will not ever receive a ping response as no coil or other sensing/transmitting means is located in these portions of the device 1406. Examples of charging coils of charging device 1400 that may sense the device 1406 through passive or analog pinging but will not receive a ping response are shown shaded with horizontal lines and include coils LP1, LP2, LP5, and LP7-LP10 (i.e., $1404_1$, $1404_2$, $1404_5$, and $1404_7$-$1404_{10}$). In the cases of these coils $1404_1$, $1404_2$, $1404_5$, and $1404_7$-$1404_{10}$, since passive pinging detects the presence of these portions or objects, a normal procedure is to then issue a digital or active ping with these coils, such as was described in connection with FIG. 13. As noted before, however, active or digital pinging with these coils may result in increased system noise, wasted power, and undesirable heating of the object.

Figure 15:
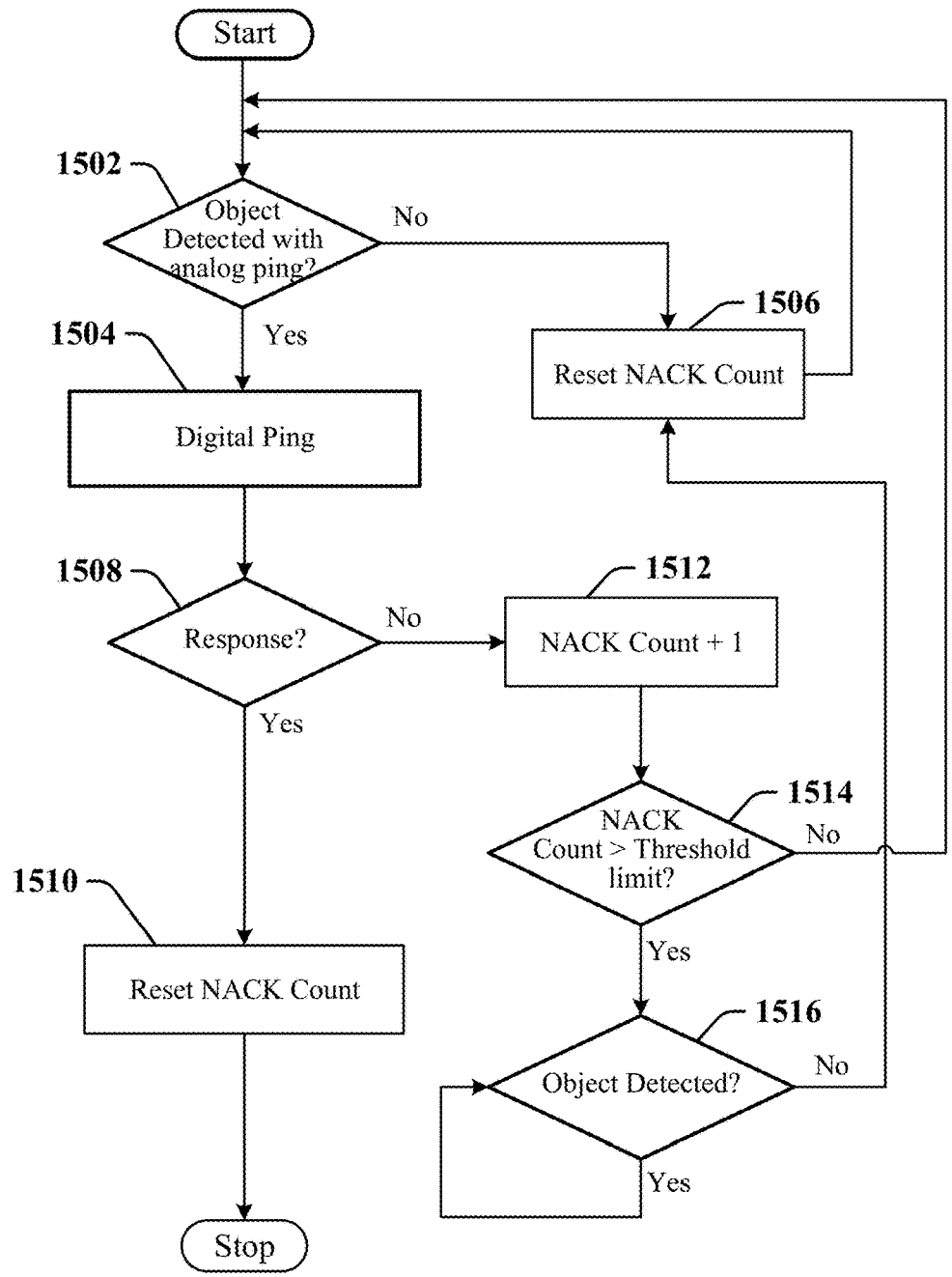
FIG. 15 is a flowchart illustrating a digital ping lockout procedure that may be employed in accordance with aspects disclosed herein.

Accordingly, FIG. 15 illustrates a flow diagram of a method 1500 that may be implemented in a wireless charging device, such as device 1400, to stop digital pinging (i.e., digital ping lockout) by coils that will not or do not receive ping responses from a receiving device or object. This method 1500 mitigates the noise, power waste, and heating that may occur with the normal procedure of FIG. 13. In particular, method 1500 includes first determining if an object has been detected by an analog ping from at least one coil (e.g., $1404_1$) as shown at block 1502. If an object is detected, flow proceeds to block 1504 where digital pinging is executed by the coil. If no object is detected, flow proceeds to block 1506 where a non-acknowledgement (NACK) counter or a similar function is reset. It is noted that the NACK counter is used to count each instance when the coil does not receive a digital ping response in order to limit the number of digital pings sent by a coil as will be explained below. It is noted that from block 1506, flow proceeds back to the start of method 1500 to restart the passive or analog pinging process to try to detect if an object is present.

After digital pinging has been performed in block 1504, a check is made whether a ping response to the digital ping has been received in the coil from the object as shown at decision block 1508. If a response is received, flow proceeds to block 1510 where the non-acknowledgement (NACK) count or counter is reset.

Alternatively at block 1510, if no response is received in response to the digital ping, flow proceeds to block 1512 where the NACK count or counter is incremented by one (1). Next, flow proceeds to decision block 1514 where the current value of the NACK counter is compared to a predetermined threshold value corresponding to a maximum number of successive non-responses from each digital ping. If the current value of the NACK count or counter does not exceed the threshold value, flow proceeds to back to the start and analog pinging and the determination of the presence of an object in block 1502 through the analog pinging, and subsequent digital pinging if the object is still present as determined by the analog pinging.

When the NACK count or counter exceeds the predetermined threshold as determined in block 1514, which indicates that the maximum number of successive non-responsive digital pings have been sent, flow proceeds to block 1516. At block 1516, analog pinging may continue to check for the presence of the object. The decision block 1516 (and analog pinging) continues in a loop until the object is moved and no longer detected. Since the block 1516 continues in a loop, digital pinging is ceased or locked out while the non-responsive object is present and detected by the coil. Once the object is removed, flow proceeds to block 1506 where the NACK count or counter is reset and flow proceeds to the start of method 1500. Accordingly, method 1500 limits the number of successive digital pings that are issued by a coil for a non-responsive object. In some aspects, the NACK count may be set at three as one example, but is not limited to such and could be less or more.

In further aspects, method 1500 may be implemented for each coil detecting an object with passive pinging. For example, the method 1500 may be implemented for each of coils, such as each of coils LP1, LP2, LP5, and LP7-LP10 (i.e., $1404_1$, $1404_2$, $1404_5$, and $1404_7$-$1404_{10}$) that detect the receiver device 1406 in FIG. 14.

Figure 16:
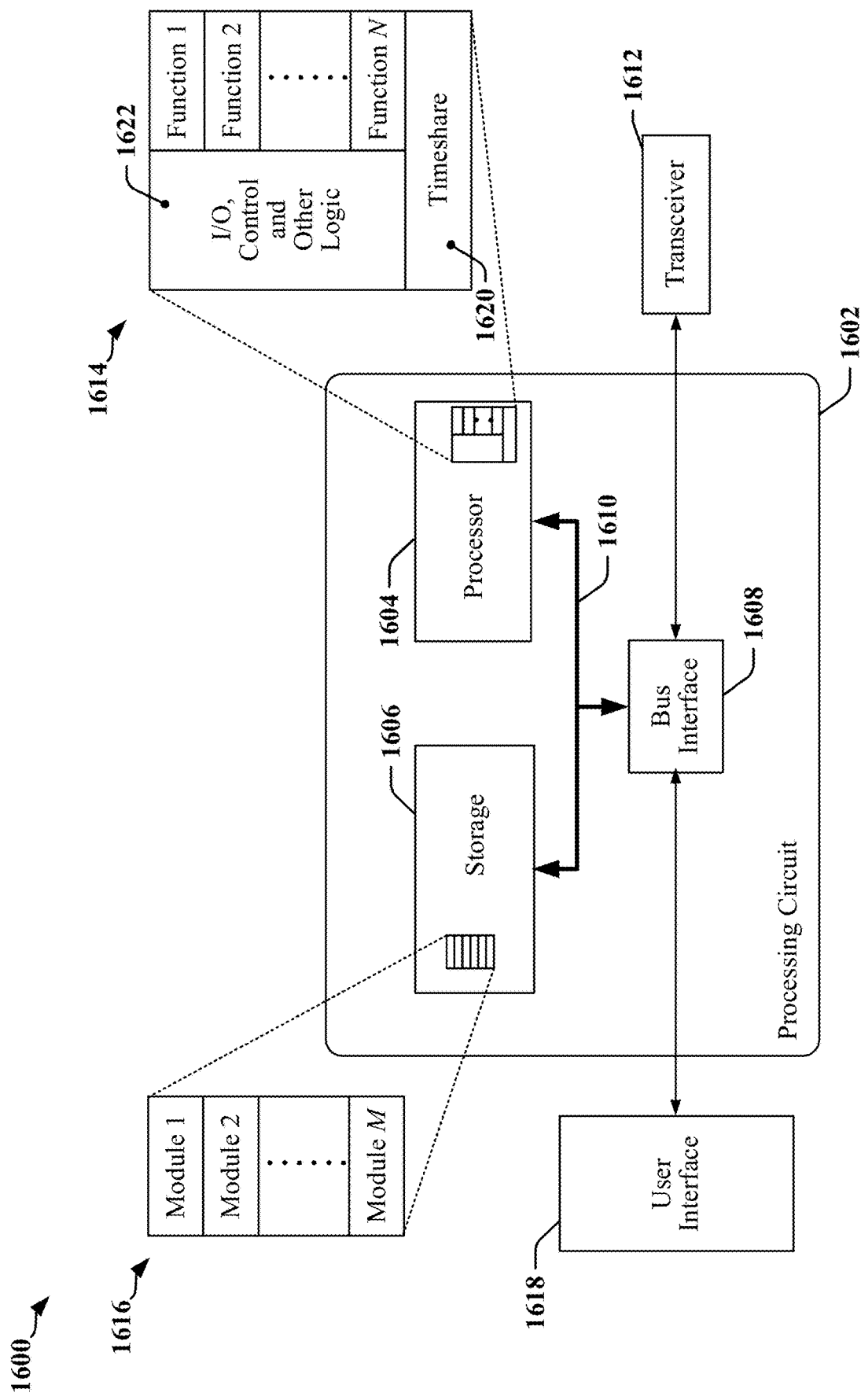
FIG. 16 illustrates one example of an apparatus employing a processing circuit that may be adapted according to certain aspects disclosed herein.

FIG. 16 illustrates an example of a hardware implementation for an apparatus 1600 that may be incorporated in a charging device that enables a battery to be wirelessly charged. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The storage 1606 may include transitory storage media and/or non-transitory storage media.

The bus 1610 may also link various other circuits such as timing sources, timers, peripherals, voltage regulators, and power management circuits. A bus interface 1608 may provide an interface between the bus 1610 and one or more transceivers 1612. In one example, a transceiver 1612 may be provided to enable the apparatus 1600 to communicate with a charging or receiving device in accordance with a standards-defined protocol. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain and/or organize software in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

In one implementation, the apparatus 1600 includes or operates as a wireless charging device that has a battery charging power source coupled to a charging circuit, a plurality of charging cells and a controller, which may be included in or implemented with one or more processors 1604. The plurality of charging cells may be configured to provide a charging surface. At least one coil may be configured to direct an electromagnetic field through a charge transfer area of each charging cell. The controller may be configured to cause the charging circuit to provide a charging current to a resonant circuit when a receiving device is placed on the charging surface, detect a change or rate of change in voltage or current level associated with the resonant circuit or a change or rate of change in power transferred to the receiving device, and determine that the receiving device has been removed from the charging surface when the change or rate of the change in voltage or current level or change or rate of change in power transferred to the receiving device exceeds a threshold value.

In some implementations, the resonant circuit includes a transmitting coil. The controller may be further configured to determine that the receiving device has been removed from the charging surface when a voltage measured at a terminal of the transmitting coil exceeds a threshold voltage level. In one example, the threshold voltage level is maintained by a lookup table and determined when the transmitting coil is electromagnetically uncoupled. In another example, the threshold voltage level is determined when the receiving device is first placed on the charging surface.

In certain implementations, the controller is further configured to cause a transmitting coil to issue a ping that may be received by a power receiving device (e.g., PRx) in proximity to wireless charging device (e.g., disposed on the wireless charging surface). Additionally, the transmitting coil may be configured to receive a ping reply such as an ASK modulated reply from the power receiving device (PRx). Additionally, the measured in the resonant circuit has a magnitude that is less than a threshold current level. In one example, the threshold current level is maintained by a lookup table and determined when no object is electromagnetically coupled with a coil in the resonant circuit. In another example the threshold current level is determined when the receiving device is first placed on the charging surface.

In some implementations, the apparatus 1600 has one or more sensors located proximate to an exterior surface of the charging device. The controller may be further configured to receive measurements from the one or more sensors, and measure the voltage or current level associated with the resonant circuit when one of the measurements indicates physical removal of the receiving device.

In some implementations, the storage 1606 maintains instructions and information where the instructions are configured to cause the one or more processors 1604 to. detect an object in proximity to a surface of the charging device through at least one passive ping using at least one coil of the charging device. In particular, this function of detecting the object with passive or analog pinging may include the processes in block 1502 in FIG. 15, as one example.

In further implementations, the storage 1606 maintains instructions and information where the instructions are configured to cause the one or more processors 1604 to ping the detected object with one or more active pings from the at least one coil. In particular, this function of digital or active pinging may include the process in block 1504 in FIG. 15, as one example.

Additionally, the storage 1606 maintains instructions and information where the instructions are configured to cause the one or more processors 1604 to determine whether a ping response is received with the at least one coil from the object in response to the one or more active pings from the at least one coil. In particular, this function may include the process in block 1506 in FIG. 15, as one example.

Figure 17:
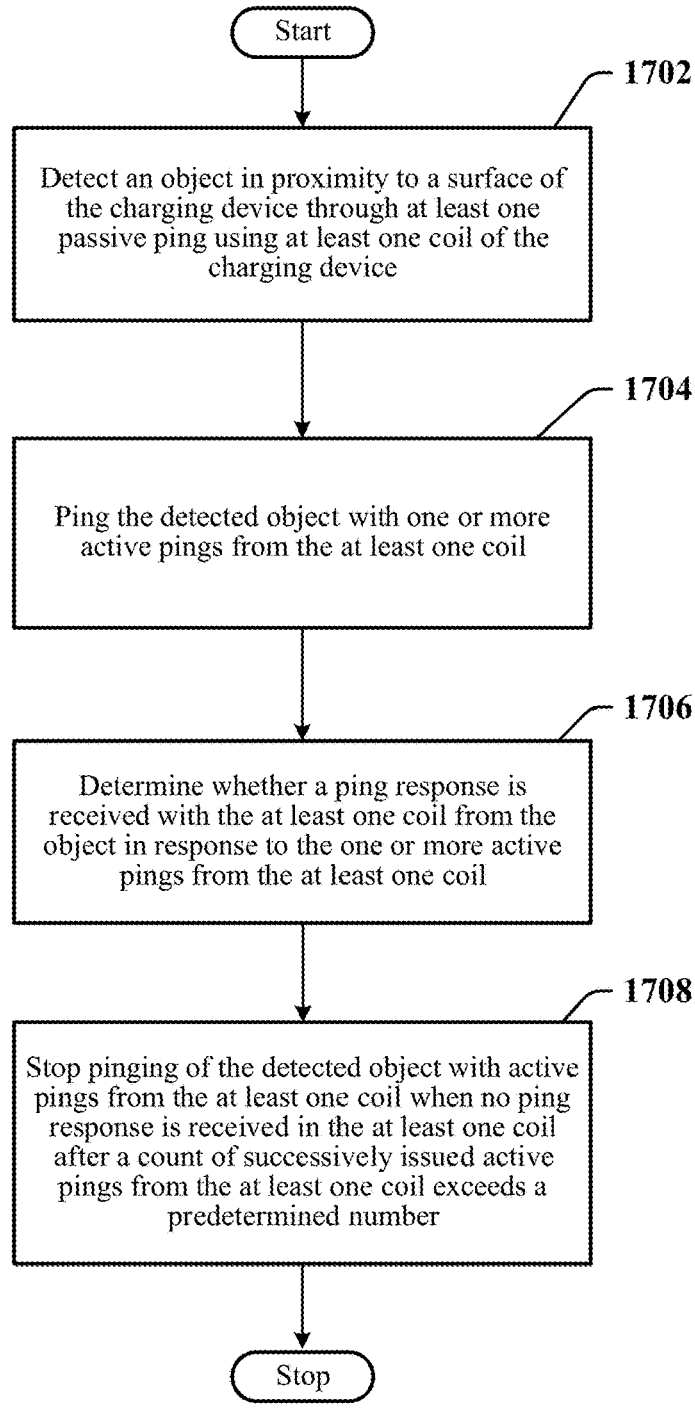
FIG. 17 illustrates a method for operating a charging device in accordance with certain aspects of this disclosure.

Furthermore, the storage 1606 maintains instructions and information where the instructions are configured to cause the one or more processors 1604 to stop pinging the detected object with active pings from the at least one coil when no ping response is received in the at least one coil after a count of successively issued active pings from the at least one coil exceeds a predetermined number. In particular, this function of may include the processes in blocks 1512 and 1514 in FIG. 15, as one example FIG. 17 is a flowchart illustrating a method 1700 for operating a charging device in accordance with certain aspects of this disclosure. The method 1700 may be performed by a controller in the charging device. At block 1702, the controller may detect an object in proximity to a surface of the charging device through at least one passive ping using at least one coil of the charging device;

Additionally, the controller may ping the detected object with one or more active pings from the at least one coil as shown in block 1704. Further, the controller may determine whether a ping response is received with the at least one coil from the object in response to the one or more active pings from the at least one coil as shown in block 1706. Still further, the controller may stop pinging of the detected object with active pings from the at least one coil as shown in block 1708 and when no ping response is received in the at least one coil after a count of successively issued active pings from the at least one coil exceeds a predetermined number.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for operating a charging device, comprising:
    detecting an object in proximity to a surface of the charging device through at least one passive ping using at least one coil of the charging device;
    pinging the detected object with one or more active pings from the at least one coil;
    determining whether a ping response is received with the at least one coil from the object in response to the one or more active pings from the at least one coil; and
    locking out pinging of the detected object with active pings from the at least one coil when no ping response is received in the at least one coil after a count of successively issued active pings from the at least one coil exceeds a predetermined number,
    wherein one or more analog pings are transmitted using the at least one coil while the pinging of the detected object with active pings is locked out,
    wherein no active pings are transmitted through the at least one coil while the pinging of the detected object with active pings is locked out.

2. The method of claim 1, further comprising:
periodically detecting whether the object is in proximity to the surface of the charging device through passive pinging after locking out pinging of the detected object using active pings; and
resetting the count of successively issued active pings when the object is no longer detected through periodically detecting whether the object is in proximity to the surface of the charging device through passive pinging.

3. The method of claim 1, further comprising:
resetting the count of successively issued active pings after detecting movement of the object in proximity to the surface of the charging device through at least one passive ping using at least one coil of the charging device.

4. The method of claim 1, further comprising:
resetting the count of successively issued active pings when no object is detected in response to the one or more passive pings from the at least one coil.

5. The method of claim 1, wherein the object comprises a receiver device including at least one receiving coil portion that is operable to respond to active pings and at least one portion that is detectable with passive pings and unresponsive to the active pings.

6. A charging device, comprising:
a charging circuit; and
a controller configured to:
   detect an object in proximity to a surface of the charging device through at least one passive ping using at least one coil of the charging device;
   ping the detected object with one or more active pings from the at least one coil;
   determine whether a ping response is received with the at least one coil from the object in response to the one or more active pings from the at least one coil; and
   lock out pinging of the detected object with active pings from the at least one coil when no ping response is received in the at least one coil after a count of successively issued active pings from the at least one coil exceeds a predetermined number,
wherein one or more analog pings are transmitted using the at least one coil while the pinging of the detected object with active pings is locked out,
wherein no active pings are transmitted through the at least one coil while the pinging of the detected object with active pings is locked out.

7. The charging device of claim 6, wherein the controller is configured to:
periodically detect whether the object is in proximity to the surface of the charging device through passive pinging after locking out pinging of the detected object using active pings; and
reset the count of successively issued active pings when the object is no longer detected through periodically detecting whether the object is in proximity to the surface of the charging device through passive pinging.

8. The charging device of claim 6, wherein the controller is configured to:
reset the count of successively issued active pings after detecting movement of the object in proximity to the surface of the charging device through at least one passive ping using at least one coil of the charging device.

9. The charging device of claim 6, wherein the controller is configured to reset the count of successively issued active pings when no object is detected in response to the one or more passive pings from the at least one coil.

10. The charging device of claim 6, wherein the object comprises a receiver device including at least one receiving coil portion that is operable to respond to active pings and at least one portion that is detectable with passive pings and unresponsive to the active pings.

11. A processor-readable storage medium comprising code that, when executed by a processor, cause one or more processors to:
detect an object in proximity to a surface of a charging device through at least one passive ping using at least one coil of the charging device;
ping the detected object with one or more active pings from the at least one coil;
determine whether a ping response is received with the at least one coil from the object in response to the one or more active pings from the at least one coil; and
lock out pinging of the detected object with active pings from the at least one coil when no ping response is received in the at least one coil after a count of successively issued active pings from the at least one coil exceeds a predetermined number,
wherein one or more analog pings are transmitted using the at least one coil while the pinging of the detected object with active pings is locked out,
wherein no active pings are transmitted through the at least one coil while the pinging of the detected object with active pings is locked out.

12. The processor-readable storage medium of claim 11, further comprising code that causes the one or more processors to:
periodically detect whether the object is in proximity to the surface of the charging device through passive pinging after locking out pinging of the detected object using active pings; and
reset the count of successively issued active pings when the object is no longer detected through periodically detecting whether the object is in proximity to the surface of the charging device through passive pinging.

13. The processor-readable storage medium of claim 11, further comprising code that causes the one or more processors to:
reset the count of successively issued active pings after detecting movement of the object in proximity to the surface of the charging device through at least one passive ping using at least one coil of the charging device.

14. The processor-readable storage medium of claim 11, further comprising code that causes the one or more processors to:
reset the count of successively issued active pings when no object is detected in response to the one or more passive pings from the at least one coil.

15. The processor-readable storage medium of claim 11, wherein the object comprises a receiver device including at least one receiving coil portion that is operable to respond to active pings and at least one portion that is detectable with passive pings and unresponsive to the active pings.

* * * * *